(12) United States Patent
Kwan et al.

(10) Patent No.: US 12,530,278 B1
(45) Date of Patent: Jan. 20, 2026

(54) TEST ACCOUNT AND TEST ARTIFACT MANAGEMENT

(71) Applicant: Amazon Technologies, Inc., Seattle, WA (US)

(72) Inventors: Yuk Lun Patrick Kwan, Bellevue, WA (US); Trey Walker Porter, Seattle, WA (US); Huang Li, Seattle, WA (US); Chenghao Sun, Seattle, WA (US); Virti Pitliya, Ratlam (IN); Siva Shankaran Vasanth, Redmond, WA (US); Gary Rittinger, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 17/571,808

(22) Filed: Jan. 10, 2022

(51) Int. Cl.
G06F 9/44 (2018.01)
G06F 11/3668 (2025.01)
G06Q 20/40 (2012.01)

(52) U.S. Cl.
CPC ....... G06F 11/3672 (2013.01); *G06Q 20/407* (2013.01)

(58) Field of Classification Search
None
See application file for complete search history.

(56) References Cited

U.S. PATENT DOCUMENTS

| 8,739,282 B1 * | 5/2014 | Jayaraman | G06F 8/30 713/188 |
| 9,274,935 B1 * | 3/2016 | Lachwani | G06F 9/44505 |
| 10,304,349 B1 * | 5/2019 | Stickle | G09B 7/02 |
| 10,387,297 B1 * | 8/2019 | Elgarat | G06Q 10/0633 |
| 10,476,758 B2 * | 11/2019 | Marvin | H04L 41/50 |
| 10,776,753 B1 * | 9/2020 | Krishnamoorthy | G06Q 50/18 |
| 2002/0072873 A1 * | 6/2002 | Liu | G06F 21/6218 702/119 |
| 2003/0050929 A1 * | 3/2003 | Bookman | G06F 40/247 |
| 2009/0144183 A1 * | 6/2009 | Gatchell | G06Q 30/04 705/34 |
| 2010/0205448 A1 * | 8/2010 | Tarhan | H04L 63/0807 713/185 |
| 2012/0331441 A1 * | 12/2012 | Adamson | G06F 11/3664 717/134 |
| 2013/0219217 A1 * | 8/2013 | Seren | G06F 11/3664 714/E11.178 |
| 2013/0326471 A1 * | 12/2013 | Nucci | G06F 11/3664 717/105 |
| 2015/0370674 A1 * | 12/2015 | Lazar | G06F 11/263 705/14.1 |

(Continued)

*Primary Examiner* — Bradley A Teets
*Assistant Examiner* — Lanny N Ung
(74) *Attorney, Agent, or Firm* — BakerHostetler

(57) ABSTRACT

Systems and methods for test account management are disclosed. Data may be stored for a plurality of test accounts in at least one memory. Each test account is associated with a test account pool. Data indicative of a plurality of rules associated with the plurality of test accounts may be received. At least one rule indicates an expiration date. The expiration date for the plurality of test accounts may be set in the at least one memory based on the at least one rule indicating the expiration date. The plurality of test accounts may be automatically suspending upon determining that the expiration date is expired. The at least one memory may be updated to indicate that the plurality of test accounts are suspended.

20 Claims, 21 Drawing Sheets

(56) References Cited

U.S. PATENT DOCUMENTS

| | | | |
|---|---|---|---|
| 2017/0109211 A1* | 4/2017 | Feng | G06F 9/45558 |
| 2019/0050791 A1* | 2/2019 | Larson | G06Q 10/087 |
| 2021/0312300 A1* | 10/2021 | Channasamudram Sampath | G06N 5/025 |
| 2022/0309387 A1* | 9/2022 | Rodriguez | H04L 9/3213 |

* cited by examiner

```
{
    "action": "Set Account Life Cycle",
    "inputs": {
        "AccountId": "123123123123",
        "expireOn": "2022-01-01",
        "timeToLive": "30 days"
    }
}
602

{
    "action": "Set Testing Artifact Life Cycle",
    "inputs": {
        "ArtifactId": "123123123123",
        "expireOn": "2022-01-01",
        "timeToLive": "30 days",
        "owner": "lihung",
        "status": ""
    }
}
604
```

```
{
    "project": "TEST",
    "customerName": "TEST",
    "testSteps": [
        {
            "action": "          ACTION          ",
            "inputs": {
                "accountPool"           ACCOUNT NAME           ",
                "accountCreationDateBefore": "2020-05-21",
                "country": "US",
                "marketplaceGroup": " X ",
                "sor": " X ",
                "city": " CITY "
            }
        }
    ]
}
```

FIG. 8

| identifier | poolName | owner | creator | lastModifiedBy | lastModifyDate | creationDate | status |
|---|---|---|---|---|---|---|---|
| test account pool identifier | Test Account Pool Name | tre | schengh | schengh | 4/8/2019 | 4/8/2019 | Active |
| test account pool identifier | Test Account Pool Name | schengh | schengh | schengh | 4/8/2019 | 4/8/2019 | Inactive |
| test account pool identifier | Test Account Pool Name | tre | schengh | schengh | 4/8/2019 | 4/8/2019 | Active |

| accountID | accountPoolIdentifier | marketplaceGroup | countryCode | sor | paymentInstrument | note | status | creationDate |
|---|---|---|---|---|---|---|---|---|
| 4492163380081 | test account pool | Group | US | sor | Credit Card | Custom note | Ready for test | 4/8/2019 |
| 4492242231081 | test account pool | Group | US | sor | Invoice | Custom note | Test in progress | 4/8/2019 |
| 4492122311081 | test account pool | Group | US | sor | Credit Card | Custom note | Ready for test | 4/8/2019 |

| uuid | accountID | RunBy | description | creationDate | accountPoolIdentifier | status |
|---|---|---|---|---|---|---|
| tra8708bed0-cf18-4e6c-8498-be5250ab9b0 | 4492163398381 | Tre | Created with Kepler Test Creation Wizard | 4/8/2019 | AWS Test Account Pool | Success |
| tra8708bed0-cf18-4e6c-8498-be5250ab9b1 | 4492163398381 | Tre | null | 4/8/2019 | AISPL Test Account Pool | Failed |
| schedgh8708bed0-cf18-4e6c-8498-be5250ab9b2 | 4492163398381 | Tre | null | 4/8/2019 | AWS Test Account Pool | Success |

Receive data indicative of a plurality of rules associated with a plurality of test accounts, at least one rule indicating an expiration date and at least one other rule indicating at least one life cycle date associated with each of the plurality of test accounts, the at least one life cycle date occurring before the expiration date 1702

Determine that the at least one life cycle date is the current date 1704

Automatically remove test artifacts associated with the each of the plurality of test accounts without suspending the test accounts 1706

Send a notification associated with a status of each of the plurality of test accounts to users associated with each of the plurality of test accounts, wherein the notification indicates at least that the test artifacts have been removed 1708

FIG. 17

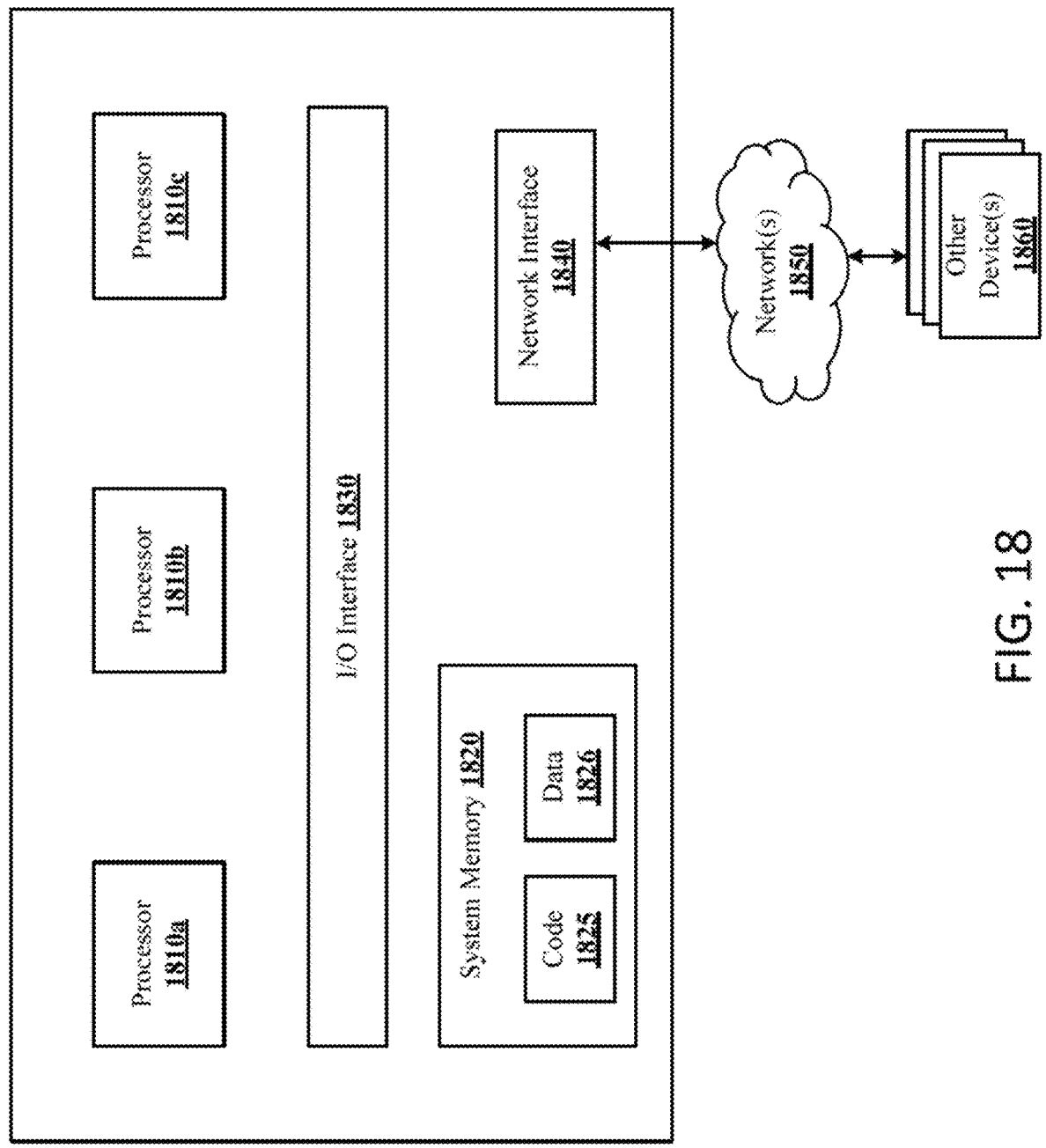

TEST ACCOUNT AND TEST ARTIFACT MANAGEMENT

BACKGROUND

Service-oriented systems (also referred to herein as "service provider networks", or just "provider networks") comprise a variety of types of computing-related resources and/or services for executing a variety of tasks on behalf of a customer. Such tasks can include, for instance, executing code (e.g., an application/user function) on behalf of the customer, executing queries for the customer, and the like. Service provider networks may launch new programs and/or new features for use by customers. Such new features may need to be tested before they are launched to ensure that they are working as expected. However, such testing can be costly or inefficient.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

FIG. 6 is an example rule file.

FIG. 8 is an example test file.

FIGS. 11A-B are example user interfaces for test account pool management.

FIGS. 12A-B are example user interfaces for test account pool management.

FIGS. 13A-B are example user interfaces for test account pool management.

FIG. 17 is a flowchart showing another example process for managing testing accounts.

FIG. 18 is a diagram illustrating an example computing system that may be used in some embodiments.

DETAILED DESCRIPTION

Various embodiments for a framework for managing test accounts and/or test artifacts associated with testing performed by a provider network are described. Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

Figure 1:
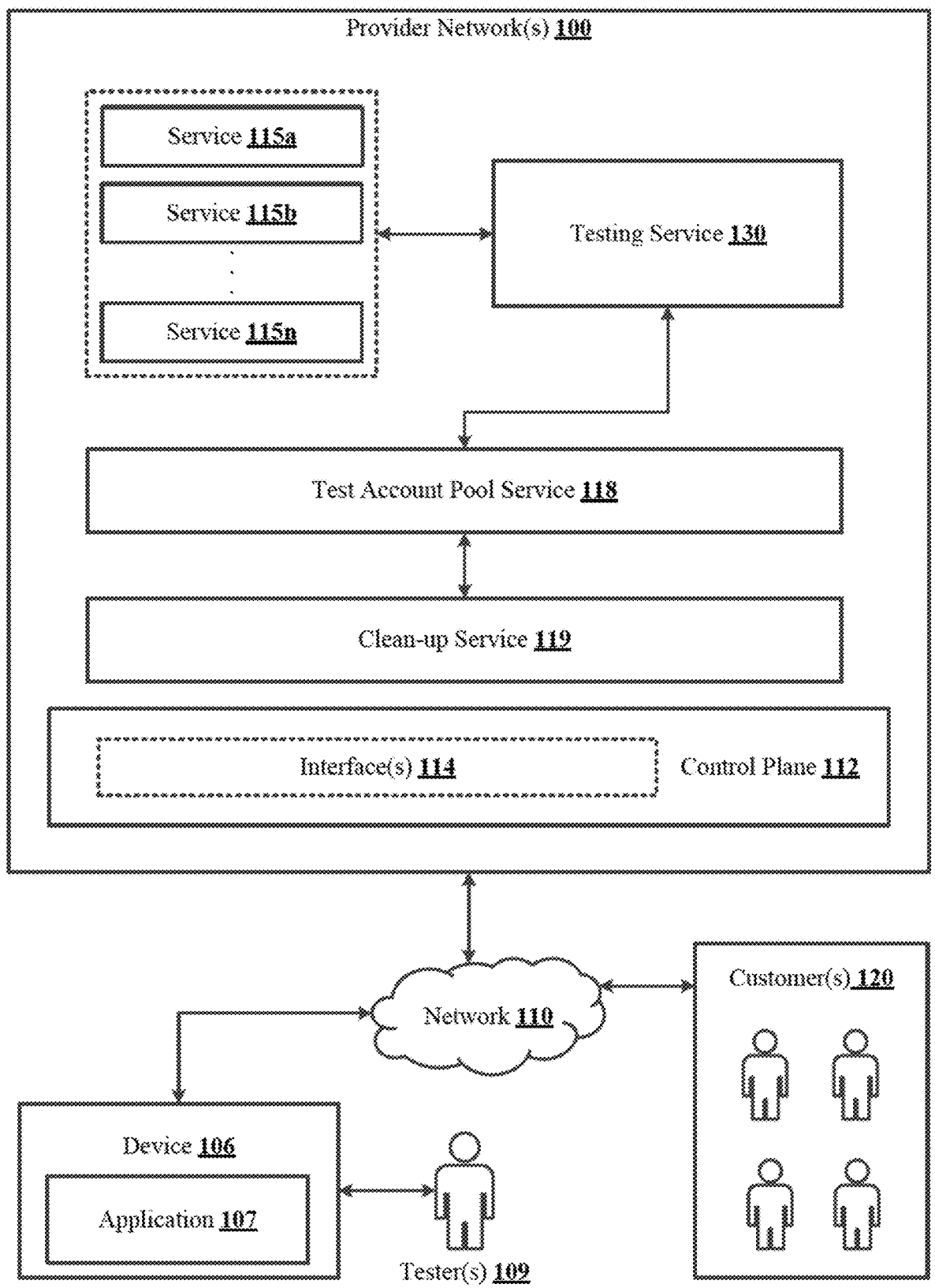
FIG. 1 is a diagram illustrating an example framework for testing features of programs provided by a provider network.

FIG. 1 is a diagram illustrating a framework for testing features of programs provided by a provider network, according to some embodiments. In certain embodiments, a testing service 130 provides a framework for testing and validating features of programs provided by a provider network. In FIG. 1, the testing service 130 is shown as part of a provider network 100, though in other embodiments the testing service 130 may be implemented outside of a provider network 100, such as within a private or "on premise" network environment of an organization.

The provider network 100 provides customers 120 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services (e.g., 115A to 115N), such as a hardware virtualization service that can execute compute instances, a storage service that can store data objects, a serverless execution service that can execute code (e.g., a program) on behalf of the customers 120.

The customers 120 may utilize one or more user accounts that are associated with a customer account, though these terms may be used somewhat interchangeably depending upon the context of use. The customers 120 may interact with the provider network 100 across one or more intermediate networks 110 (e.g., the internet) via one or more interface(s) 114, such as through use of application programming interface (API) calls, via a console implemented as a website or application, etc. The interface(s) 114 may be part of, or serve as a front-end to, a control plane 112 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

In certain embodiments, the provider network 100 provides the testing service 130 for testing and validating features of programs provided by the provider network 100 to customers 120. In certain embodiments, a self-onboarding service may sit between the testing service 130 and the services 115a-n. In certain embodiments, the testing service 130 comprises one or more components such as a test execution orchestrator, a queue service, and a validation service. These components may be implemented as software, hardware, or a combination of both using one or more multiple computing devices located at one or more multiple locations in the provider network 100.

In certain embodiments, a tester 109 initiates the testing and validation of features of programs provided by the provider network 100 to customers 120. The tester 109 can be associated with the provider network 100. For example, the tester 109 can be an employee of the provider network 100. The tester 109 can be associated with the creation of the features that need to be tested and validated. Alternatively, the tester 109 can be unassociated with the provider network 100. In such a case, the tester 109 could test features provided by the provider network or features provided by customers or other entities external to the provider that provide feature usable with the provider network.

A tester 109 may utilize an application 107 of an electronic device 106 to generate a test specification for testing features of programs provided by the provider network. The electronic device 106 can be, for example, a laptop, although the electronic device 106 can be any type of device, such as a desktop computer, a portable computing device, a smart phone, a tablet, etc. As noted above, a program may refer to a function which can be a portion of code, a compiled or interpreted application, a set of procedures or routines, etc., that can be run or executed using one or more computing resources in the provider network. In certain embodiments, the test specification may specify one or more actions and the order in which the actions should be performed to test the functionality of the program. In certain examples, the actions may specify one or more pre-conditions that must be fulfilled prior to executing the test specification. In certain examples, the actions may specify one or more validation blocks to be executed as part of validating features associated with the program.

In some embodiments, the tester 109 may utilize a user interface (UI) of the electronic device 106 to generate the test specification. The UI may include a text-based UI, a graphical UI (GUI), or a combination of both to enable the user to generate the test specification. For example, the user may input text to generate the test specification or may select (e.g., via a mouse or touchscreen) graphical elements to create the test specification, or a combination of both.

The test specification may be received by testing service 130 via one or more interfaces 114 in the control plane 112. For example, the test specification may be received by a test execution service of the testing service 130. In some embodiments, the test execution service may be implemented using one or more serverless functions executed by an on-demand code execution service. The on-demand code execution service may include a "serverless" function which may include code (e.g., to implement test execution) provided by a tester 109 or other entity that can be executed on demand. Serverless functions may be maintained within the provider network 100 and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In certain embodiments, the test execution service includes a test execution orchestrator. The on-demand code execution service may include one or more serverless functions to implement the test execution orchestrator, though in other embodiments the test execution orchestrator may be implemented differently—e.g., as a traditional standalone application executed by a hardware virtualization service, etc. The test execution orchestrator may identify the order in which the actions specified in the test specification should be executed and orchestrate the execution of these actions. As noted above, the actions may include one or more preconditions that must be fulfilled prior to executing the test specification and one or more feature validation blocks to be executed as part of validating features. For instance, upon receiving the test specification, the test execution orchestrator may identify a first action to be performed and transmit a message to be placed in a queue provided by a queue service of the test execution service, the message indicating a request to execute the action.

The queue service may include a plurality of queues that store queued events or messages (which can be requests or other data structures, as described herein). The plurality of queues can be implemented using hardware, as software, or a combination of both. For example, a queue may comprise a region of memory (e.g., Random Access Memory (RAM)) or storage (e.g., a Solid-State Disk (SSD)). A queue could alternatively be a virtual storage entity, such as a bucket or folder, which may be provided by a storage virtualization service. A queue could also comprise a set of tables or records of a database. Other implementations of queues known to those of skill in the art could also be used.

In certain embodiments, the queue service is a component in the provider network 100 that is capable of receiving messages generated or triggered by a variety of entities in the provider network 100. For instance, as described above, the queue service can receive a message from the test execution orchestrator indicating a need to perform a first action defined in the test specification and store it in a queue. In some embodiments, each queue of the queue service may store messages associated with a different action (or a group or type of actions) that can be performed to test the application. For instance, a first queue may store messages related to a first action defined in the test specification, a second queue may store messages related to a second action, a third queue may store messages related to a third action, and so on. In other embodiments, the queue service may utilize a single queue for storing messages related to all the actions defined in the test specification.

In certain embodiments, the test execution service may include one or more workflow execution agents that obtain queued messages from the queues and cause them to be distributed and/or processed in a particular manner by particular services (115A-115N). Thus, upon obtaining a message associated with an action from a queue, a workflow execution agent may communicate with a desired service (e.g., 115A) to execute the desired action.

Upon beginning processing the action or upon the completion of the processing of the action (e.g., by the test execution service or the workflow execution agent itself), the workflow execution agent may cause that message to be removed from the particular queue and may cause a result of the execution of the action to be provided to a storage service in the provider network 100. Additionally, or alternatively, upon completion (i.e., execution) of a particular action, the service (e.g., 115A) or the workflow execution agent may notify the test execution orchestrator which can the proceeds to execute the next action defined in the test specification. The workflow execution agents may be implemented in hardware, software, or a combination of both by one or more computing devices.

In certain embodiments, the queue service may receive a message from the test execution orchestrator to be placed into a queue indicating a need to validate content specified in a content validation block defined in the test specification. The queue service may obtain the queued message (or event) from the queue and transmit the message to a workflow execution agent for execution. The workflow execution agent may forward the message to a validation service in the testing service 130 for execution. In some embodiments, the workflow execution agent may store the message in a queue associated with the queue service prior to its execution by the content validation service. Alternatively, in some embodiments, when the queue service receives a message from the test execution orchestrator indicating a need to validate features, the queue service may directly store the message into queue to be provided to the validation service.

In certain embodiments, the validation service is a component in the provider network 100 that performs the validation of content generated by the application by executing one or more validation blocks defined in the test specification. The validation service comprises one or more components such as a validation orchestrator, and may utilize other services such as a database service, an object storage service, etc. These components may be implemented as software, hardware, or a combination of both using one or more multiple computing devices located at one or more multiple locations in the provider network 100.

In certain embodiments, a validation orchestrator in the validation service may obtain a queued message (i.e., a request to execute a content validation block) from the queue and orchestrate its execution. The validation orchestrator may communicate with an object definitions data store (e.g., in a database service) to identify and/or determine the object type of an object to be validated in the validation block defined the test specification. The object definitions data store may store a variety of object types and object definitions identifying one or more data fields for objects to be validated by the validation service.

In certain embodiments, the object types and object definitions stored in the object definitions data store may be defined by users (e.g., tester 109) of the provider network 100. For instance, users may define new object types and corresponding object definitions for objects to be validated by the validation service and add and/or register these definitions to the object definitions data store. Additionally, in certain embodiments, users may write code to retrieve data generated by a program from one or more services (115A-115N) in the provider network and add this code to the object definitions data store.

Upon identifying the object type of the object to be validated, the validation orchestrator may identify, based on the object definition of the object type, an identifier associated with one or more services (115A-115N) within the provider network 100 that provide one or more artifacts generated by the application. As described herein, an artifact may refer to data provided by the services (115A-115N) that comprise actual data values corresponding to the object to be validated in the validation block. In certain embodiments, the artifacts may be generated by the program based on the performance of the actions defined in the test specification. For instance, the artifacts generated by an invoice program may include data that corresponds to actual values associated with the data fields (e.g., bill amount, charge amount, tax amount, credit amount, and description) specified in the object definition for the invoice object type defined in the test specification.

In certain embodiments, the validation orchestrator may utilize the information stored in the object definitions data store to identify the services that provide the artifacts generated by the program. For instance, the validation orchestrator may identify the services by performing a lookup in a data structure in the object definitions data store to identify identifiers (e.g., an Internet Protocol (IP) addresses) corresponding to the services. In some examples, the services 115A-115N described herein may include one or more of network-based services (e.g., a web service), applications, functions, objects, methods (e.g., objected-oriented methods), subroutines, or any other set of computer-executable instructions. The validation orchestrator may establish a connection with one or more of the services 115A-115N based on the identifiers associated with the services and obtain the artifacts generated by the application from the services. In certain embodiments, the validation orchestrator may utilize additional information stored in the object definitions data store to obtain the artifacts provided by the services. For instance, this additional information may include an identifier (e.g., an IP address) associated with a service, an API definition to an endpoint defined for the service, mapping information associated with the objects and so on.

The validation orchestrator may then obtain the artifacts generated by the program from the services. In certain embodiments, the validation orchestrator may identify the actual data values from the artifacts based on mapping information associated with the object definition that maps the data fields with the actual data values from the artifacts. For instance, continuing with the example of the invoice program discussed above, a "bill amount" data field specified in the object definition for an invoice object type stored in the object definitions data store may correspond to a "bill amt" value in the artifacts provided by a service that includes the actual data values corresponding to the bill amount data field specified in the object definition. In this situation, the validation orchestrator may utilize mapping information stored in the object definitions data store to identify that the "bill amt" value in the artifacts comprises the actual data values corresponding to the "bill amount" data field specified in the object definition. The validation orchestrator may then compare the expected data values specified in the content validation block to the corresponding actual data values obtained from the artifacts to generate a validation result.

In certain embodiments, upon generating the validation result, the validation orchestrator may communicate a status of the validation result to a test case validation metadata datastore. For instance, the status may be an indicator (e.g., "complete") provided to the test case validation metadata datastore that the feature specified in the validation block in the test specification has been successfully validated. Other status values may additionally or alternatively be used, such as "in progress", "failed", and so on. The validation orchestrator may store the validation result in an object storage service. The test execution service may detect the existence of the validation result stored in the object storage service (e.g., based on detecting a completion of feature validation from the validation service) and obtain the validation result from the object storage service.

The test execution service may transmit the validation result to the client. In certain embodiments, the test execution service may include a report generator that transforms the validation result into a validation report prior to transmission to the client. For example, the report generator may transform the validation result into a validation report in a format that is suitable to the client such as eXtensible Markup Language (XML), JavaScript Object Notation (JSON), etc.

In some embodiments, the above-described testing and validation process performed by the testing service 130 can be costly or inefficient. For example, before the tester 109 is able to test and validate features (e.g., before the tester 109 is able to send the test specification to the testing service 130), the tester 109 may be required to create a test account using the testing service 130. The test account may be used to perform one or more testing projects. For example, the tester 109 may use the test account to test and validate one or more features. However, the tester 109 may need to manually track the test accounts that he or she uses in order to reuse them, to do manual testing/validation, and/or to clean up the test accounts when the testing projects being performed via the test accounts are finished. Waiting on such manual input from the tester 109 can contribute to delays in project launches.

As another example, a test account may setup computing instances that will continue to accrue usage if the test account is not shut down. For example, when a feature or project is launched, if the tester 109 does not manually clean up or recycle the test accounts or test artifacts which were generated to support the project, the computing instances will continue to accrue usage. Such usage is costly and wastes computing resources. If test account owners are not reminded about the test accounts and resources that they keep, the test account owners may never clean-up or recycle such accounts or artifacts.

In certain embodiments, the provider network 100 provides a test account pool service 118 for managing test accounts and test artifacts generated as a result of the above-described testing and validation process. In certain embodiments, the test account pool service 118 comprises one or more components such as a test account pool management service, a rule management service, a notification service, an auditor, and/or an account cleaner service. These components may be implemented as software, hardware, or a combination of both using one or more multiple computing devices located at one or more multiple locations in the provider network 100. In some embodiments, the test account pool service 118 may be implemented using one or more serverless functions executed by an on-demand code execution service. Further details regarding the architecture of the test account pool service 118 will be presented later herein with regard to FIG. 2.

The test account pool service 118 remedies the above-described shortcomings associated with feature testing and validation by removing the above-described manual touch points from the testing and validation process. By integrating the test account pool service 118 with the testing service 130, testers no longer need to track test accounts or artifacts during the testing process. The entire test account lifecycle, from creation to suspension, can be tracked and managed by the test account pool service 118. The test account pool service 118 can include a rule management engine that validates test account and testing artifacts, which removes the need for testers to do manual validation. After a testing project is completed, the test account pool service 118 may automatically suspend test accounts. Such automatic suspension of test accounts post-testing project frees up computing resources (such as cloud resources, CPU resources, or storage). The test account pool service 118 can include an auditing component that is configured to routinely detect misconfigured or problematic test resources, such as when a test account is missing an owner or when a test account has open bills.

In certain embodiments, the provider network 100 provides a clean-up service 119 for cleaning up and suspending test accounts after testing projects are determined to be completed by the test account pool service 118. In certain embodiments, the clean-up service 119 comprises one or more components that may be implemented as software, hardware, or a combination of both using one or more multiple computing devices located at one or more multiple locations in the provider network 100. In some embodiments, the clean-up service 119 may be implemented using one or more serverless functions executed by an on-demand code execution service. Further details regarding the functionality of the clean-up service 119 will be presented later herein with regard to FIG. 7.

Figure 2:
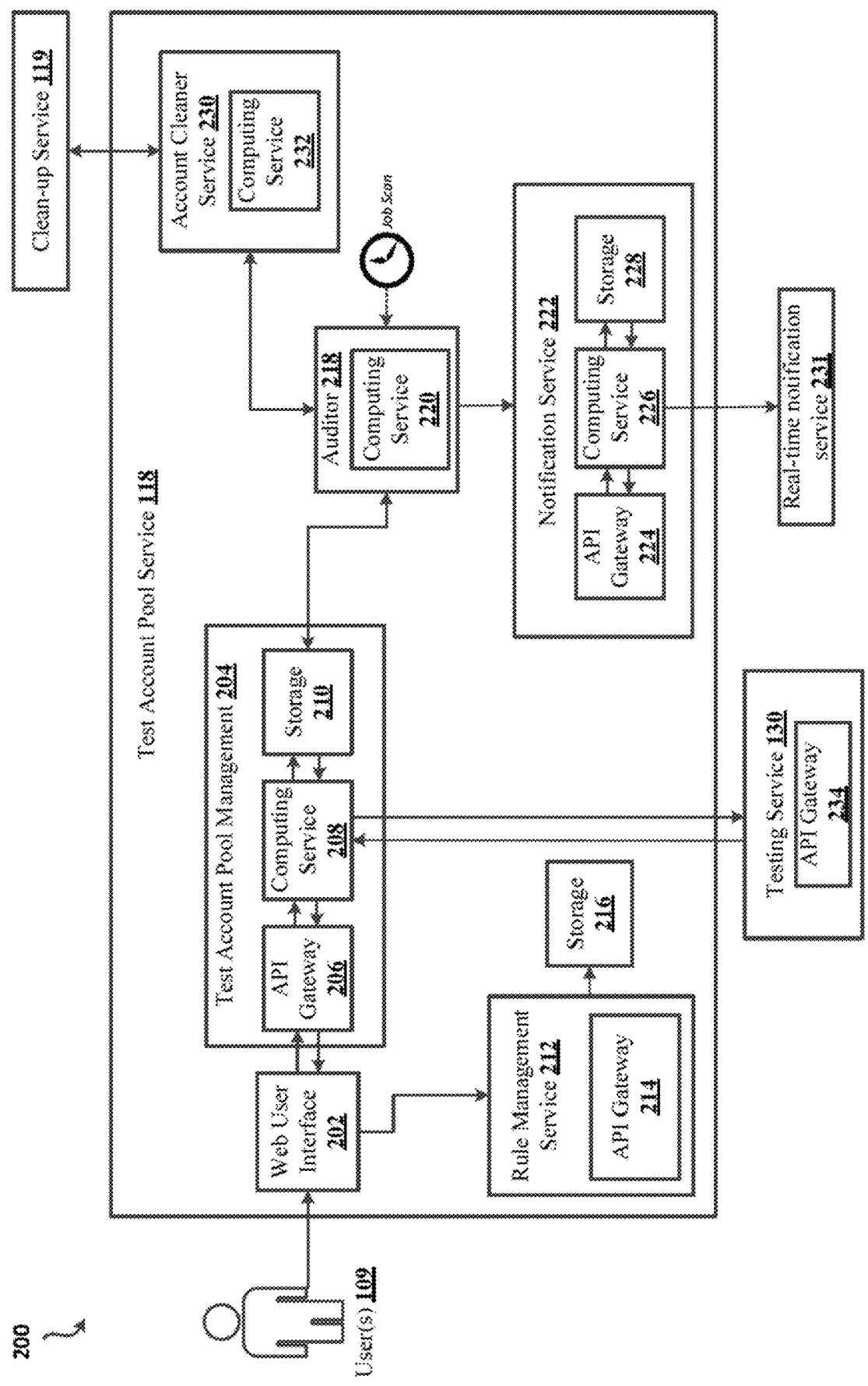
FIG. 2 is a diagram illustrating an example framework for managing test accounts and/or test artifacts associated with feature testing performed by a provider network.

FIG. 2 is a diagram illustrating a framework 200 for managing test accounts and test artifacts generated as a result of feature testing and validations, according to some embodiments and as described above with respect to FIG. 1. As referred to herein, test artifacts include financial records or taxation records that are created through testing and/or computing resources acquired through testing. As noted, in certain embodiments, the testing service 130 provides a framework for testing and validating features of programs provided by a provider network. The testing service 130 can be integrated with or in communication with the test account pool service 118. The test account pool service 118 is configured to manage test accounts and test artifacts generated as a result of feature testing and validation performed via the testing service 130. The test account pool service 118 can be integrated with or in communication with the clean-up service 119. The clean-up service 119 is configured to clean up and suspend test accounts after testing projects are determined to be completed by the test account pool service 118.

In certain embodiments, the test account pool service 118 comprises one or more components such as a test account pool management service 204, a rule management service 212, a notification service 222, an auditor 218, and/or an account cleaner service 230. These components may be implemented as software, hardware, or a combination of both using one or more multiple computing devices located at one or more multiple locations in the provider network 100. In some embodiments, the test account pool service 118 may be implemented using one or more serverless functions executed by an on-demand code execution service.

The test account pool service 118 facilitates the user-creation of test account pools. Each test account pool may include one or more test accounts, so that test accounts can be grouped according to usage. A user, such as the tester 109, can add a test account created using the testing service 130 to a test account pool so that the account (and any other accounts belonging to that pool) can be tracked and reused. The tester 109 can provide an indication to the test account pool service 118 of account criteria, such as a name associated with the account pool, and account creation date, a SOR, a country code, an anniversary/subscription usage, and a marketplace group code. As used herein, SOR represents a seller of record or any other type of affinity for the purpose of grouping an interaction targeted to customers. Providing indications of such criteria to the test account pool service 118 facilitates the ability of the tester 109 to reuse accounts and eliminates the need for the tester 109 to manually track account identification numbers or create new accounts.

In certain embodiments, the tester 109 creates one or more test accounts using the testing service 130. To create a test account using the testing service 130, the tester 109 can upload a file (e.g., a JSON file) including attributes for the new test account and/or an existing test account pool that the new test account should be assigned to as a new parameter to an application programming interface (API) of the testing service 130. The API processes this account creation step and sends the test account information to an API of the test account pool management service 204. An API gateway 206 inside the test account pool management service 204 triggers a computing service 208 to store the account in corresponding test account pool in a storage subsystem 210. The computing service 208 may be an on-demand code execution service that executes one or more serverless functions. The computing service 208 may include a serverless function which may include code that can be executed on demand.

In other embodiments, the tester 109 creates one or more test accounts using the test account pool management service 204. The tester 109 can send a create account request to the API gateway 206 by selecting a "create account" button on a web user interface 202 associated with the test account pool management service 204. The API gateway 206 triggers the computing service 208 to send the create account request to an API gateway 234 of the testing service 130. The API gateway 234 triggers a "create account" step to create the test account and returns the new test account details to the API gateway 206. The computing service 208 receives the new test account details and stores the account into the storage subsystem 210. The computing service 208 sends, back to the test account pool management service 204, the status code to indicate success.

In some embodiments, the tester 109 may utilize a UI of the electronic device 106 to create one or more test accounts. The UI may include a text-based UI, a GUI, or a combination of both to enable the user to create the test account(s). For example, the user may input text to indicate the test account details or may select (e.g., via a mouse or touchscreen) graphical elements to indicate the test account details, or a combination of both.

Figure 3:
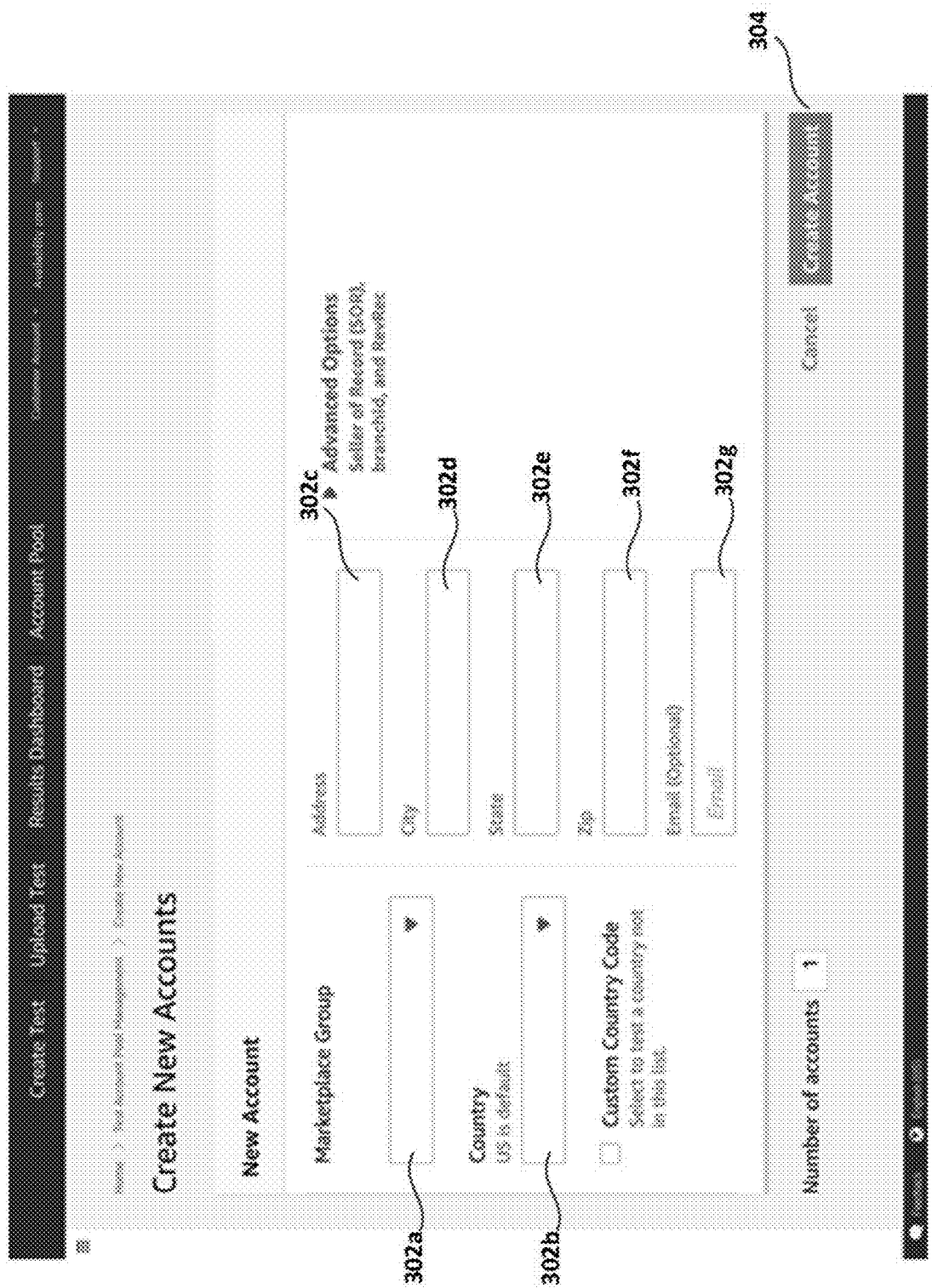
FIG. 3 is an example user interface for test account pool management.

FIG. 3 is an example UI 300 illustrating test account creation via the test account pool management service 204. The tester 109 can populate the boxes 302a-g with various attributes for the new test account. For example, the tester 109 can populate one or more of the boxes 302a-g with one or more of a marketplace group code, a country, a country code, an address, an email, and/or any other relevant account information. The tester 109 can indicate the number of test accounts that he or she wants to create with the same parameters. In this manner, the tester 109 can quickly populate the account pool and perform parallel testing with these similar accounts.

After the tester 109 has populated every box 302a-g that the tester 109 desires to populate, the user may select a button 304 to create the account. If the user selects the button 304, this may send a create account request to the API gateway 206. As discussed above with respect to FIG. 2, the API gateway 206 triggers the computing service 208 to send the create account request to an API gateway 234 of the testing service 130. The API gateway 234 triggers a "create account" step to create the test account and returns the new test account details to the API gateway 206. The computing service 208 receives the new test account details and stores the account into the storage subsystem 210. The computing service 208 sends, back to the testing service 130, the status code to indicate success.

As also described above with respect to FIG. 2, when creating a new test account (either via the testing service 130 or the test account pool management service 204), the tester 109 may assign it to a particular existing test account pool. However, in certain embodiments, the tester 109 may need and/or want to create new test account pools. The tester 109 may utilize the test account pool management service 204 to crate a new test account pool. To create a new test account pool, the tester 109 can specify the desired test account pool name and owner alias. In certain embodiments, the test account pool management service 204 can check for duplications of pool names, and, if the tester 109 entered an existing account test account pool name, a link to that test account pool will be displayed to the user.

After the user has specified the desired test account pool name and owner alias, the tester 109 can send a create text account pool request to the API gateway 206 by selecting a "create test account pool" button on a web user interface 202 associated with the test account pool management service 204. The API gateway 206 triggers the computing service 208 to send the create test account pool request to an API gateway 234 of the testing service 130. The API gateway 234 triggers a "create test account pool" step to create the test account pool and returns the new test account pool details to the API gateway 206. The computing service 208 receives the new test account pool details and stores the test account pool into the storage subsystem 210. The computing service 208 sends, back to the testing service 130, the status code to indicate success.

In some embodiments, the tester 109 may utilize a UI of the electronic device 106 to create one or more test account pools. The UI may include a text-based UI, a GUI, or a combination of both to enable the user to create the test account pool(s). For example, the user may input text to indicate the test account pool name and/or the owner alias or may select (e.g., via a mouse or touchscreen) graphical elements to indicate the test account pool name and/or the owner alias, or a combination of both.

Figure 4:
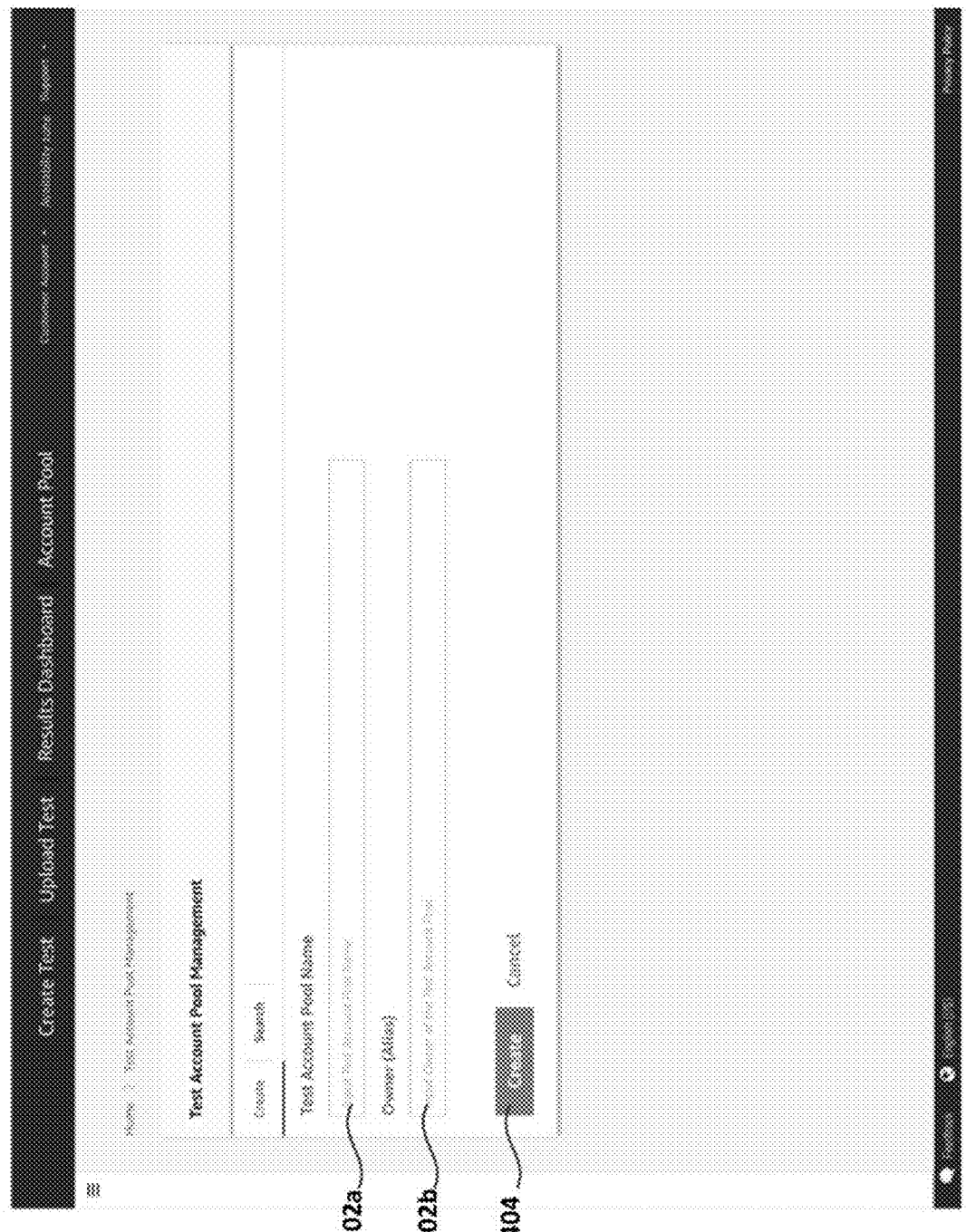
FIG. 4 is another example user interface for test account pool management.

FIG. 4 illustrates an example UI 400 depicting test account pool creation via the test account pool service 118. The tester 109 can populate the boxes 402a-b with various attributes for the new test account pool. For example, the tester 109 can populate the box 402a with the test account pool name and the tester 109 can populate the box 402b with the owner alias. After the tester 109 has populated every box 402a-b that the tester 109 desires to populate, the user may select a button 404 to create the test account pool. If the user selects the button 404, this may send a create test account pool request to the API gateway 206. As discussed above, the API gateway 206 triggers the computing service 208 to send the create test account pool request to an API gateway 234 of the testing service 130. The API gateway 234 triggers a "create test account pool" step to create the test account pool and returns the new test account pool details to the API gateway 206. The computing service 208 receives the new test account pool details and stores the test account pool into the storage subsystem 210. The computing service 208 sends, back to the testing service 130, the status code to indicate success. One or more existing test accounts can be assigned to the newly created pool. Additionally, or alternatively, any test account created after the new test account pool is created may be added to the new test account pool during creation of the test account.

Referring back now to FIG. 2, the rule management service 212 can validate test accounts and test artifacts. For example, the rule management service 212 can evaluate test accounts to determine when a test account is ready to be suspended and/or when the resources associated with the test account are ready to be reclaimed. Such validation by the rule management service 212 removes the need for testers, such as the tester 109, to do manual validation. The rule management service 212 can receive, via an API gateway 214 and from a tester 109, rules associated with a test account and/or with test artifacts associated with a test. For example, the rule management service 212 can receive rules indicative of test account and/or test artifact life cycle from the tester 109. The user may define such rules using the web user interface 202 and upload the rules to the rule management service 212. The rule management service 212 may provide, to the tester 109, a suggested or default value for test account and/or test artifact life cycles. For example, the rule management service 212 may provide, to the tester 109, a suggested or default value for recycle/expiration dates for test accounts and/or test artifacts.

The rule management service 212 may store the rules in a storage subsystem 216. The rule management service 212 can use the stored rules to evaluate test accounts to determine when a test account is ready to be suspended and/or when the resources associated with the test account are ready to be reclaimed.

Figure 5:
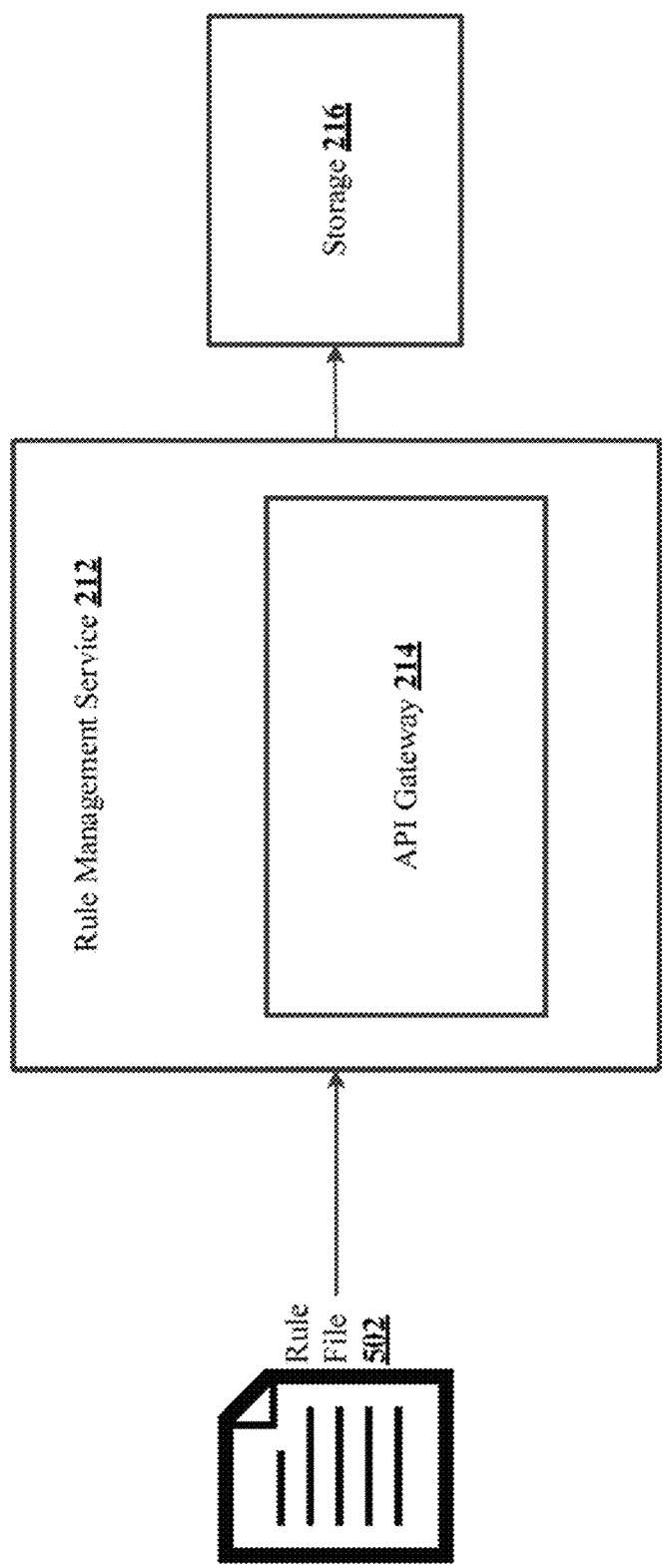
FIG. 5 is a diagram illustrating an example framework for a rule management service.

For example, as illustrated in FIG. 5, to upload the rules to the rule management service 212, the tester 109 can upload a rule file 502 (e.g., a JSON file) indicative of the rules to the rule management service 212. The rule file 502 may indicate test account and/or test artifact life. FIG. 6 illustrates an exemplary rule file 600. The rule file 600 may be a JSON file. The rule file 600 includes a first portion 602 that is associated with a test account. For example, the first portion 602 can indicate an identification number or account ID associated with the test account for which rules are being defined. The first portion 602 can indicate a date on which the tester 109 wants the test account to expire. The first portion 602 can indicate a duration of the desired life cycle of the test account. The rule file 600 includes a second portion 604 that is associated with testing artifacts. For example, the second portion 604 can indicate an identification number or artifact ID associated with the testing artifact(s). The second portion 604 can indicate a date on which the tester 109 wants the testing artifact to expire. The second portion 604 can indicate a duration of the desired life cycle of the testing artifacts. The second portion 604 can indicate an owner of the testing artifacts and/or a status of the testing artifacts. It should be appreciated that other rule files may include only some of this information, while other rule files may include one or more different items of information. The rule management service 212 may store the rule file 600 in the storage subsystem 216.

Referring again back to FIG. 2, in certain embodiments, to perform a test using a test account, the tester 109 can pass test account attributes to the API gateway 234. The API gateway 234 may send a request to the API gateway 206. The request may be a request for an account identification number associated with a test account that matches all the criteria indicated by the tester 109. The API gateway 206 may trigger the computing service 208 to query the storage 210 and return a test account identification number that matches all the criteria. The computing service 208 returns the test account identification number account to the API gateway 234. The API gateway 234 may continue to perform the remaining test procedure, such as that indicated by the test specification associated with the test.

Figure 7:
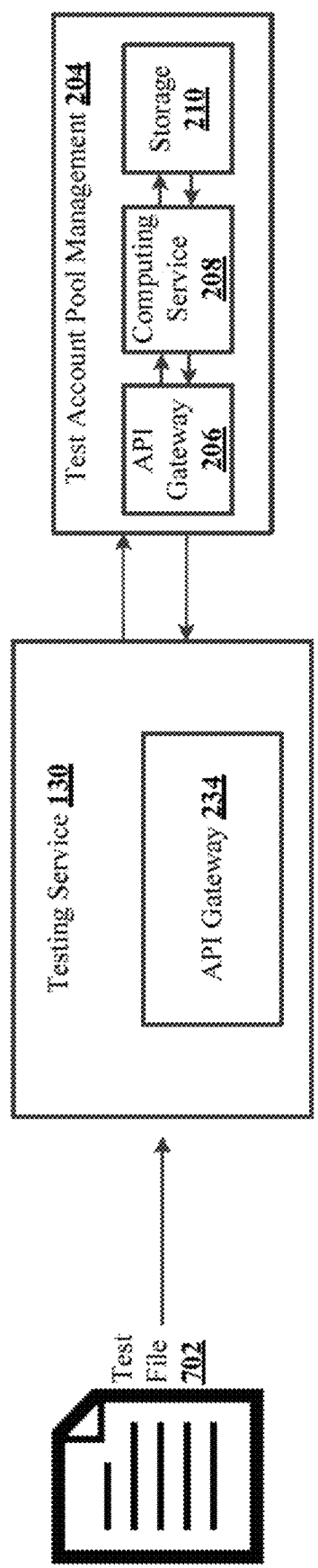
FIG. 7 is a diagram illustrating an example framework for a testing service.

For example, as illustrated in FIG. 7, to perform a test using a test account, the tester 109 can pass test account attributes to the API gateway 234 by uploading a test file 702 (e.g., JSON file) indicating account attributes to the API gateway 234 of the testing service 130. The test file 702 may indicate test account attributes of the test account associated with the test. FIG. 8 illustrates an exemplary test file 800. The test file 800 may be a JSON file. The test file 800 indicates a name associated with the test project, a synthetic customer name associated with the test, one or more steps of the test to be performed by the API gateway 234, actions to be taken, test account pool name, test account creation date, country, marketplace group, and system of record, and city. It should be appreciated that other test files may include only some of these attributes, while other test files may include one or more different attributes.

The API gateway 234 may receive the test file 800 and, in response, send a request to the API gateway 206. The request may be a request for an account identification number associated with a test account that matches all the criteria indicated in the test file 800. The API gateway 206 may trigger the computing service 208 to query the storage 210 and return a test account identification number that matches all the criteria indicated in the test file 800. The computing service 208 returns the test account identification number account to the API gateway 234. The API gateway 234 may continue to perform the remaining test procedure.

Referring back again to FIG. 2, in certain embodiments, the auditor 218 is configured to periodically (e.g., every ten minutes, every 30 minutes, every hour, etc.) scan for the test accounts in the test account pool management service 204. The auditor 218 may monitor the lifecycle of the test accounts and/or the test artifacts by looking for deterministic and/or probabilistic conditions associated with the test accounts. For example, the auditor may monitor, based on the rules stored in the storage subsystem 216 and/or based on determinations made by the rule management service 212, when an expiration date associated with a particular test account and/or test artifact is approaching.

It should be appreciated that before a test account expires, there may be various lifecycle states associated with the rest account along the way. For example, a test account may have a life cycle of six months, and there may be a lifecycle state at the end of each of those months. The auditor 218 may monitor each of these lifecycle states as well as the overall expiration date associated with the test account. In some embodiments, the auditor 218 may be implemented using one or more serverless functions executed by an on-demand code execution service (e.g., a computing service 220). The on-demand code execution service may include a "serverless" function which may include code that can be executed on demand.

In certain embodiments, the auditor 218 can determine misconfigured or problematic test resources associated with a test account. For example, the auditor 218 can determine when a test account is missing an owner or when a test account has open bills based on rules associated with the test account. For example, the auditor 218 can periodically scan the accounts to determine the account status with respect to one or more predefined rules.

In embodiments, the auditor 218 is in communication with the notification service 222. The auditor 218 can trigger or instruct the notification service 222 to notify the tester 109 about test accounts and/or test artifact status. For example, when the expiration date associated with a particular test account and/or test artifact has approached (e.g., on the expiration date), the auditor 218 can trigger or instruct an API gateway 224 of the notification service 222 to notify the tester 109 that the test account and/or test artifact has expired. Likewise, when the date of a lifecycle state is approaching or has approached (e.g., on the date of the lifecycle state), the auditor 218 can trigger or instruct trigger or instruct the API gateway 224 to notify the tester 109 of the lifecycle state. As another example, if the auditor 210 determines misconfigured or problematic test resources associated with a test account, the auditor 218 can trigger the notification service 222 to notify the tester 109 about such misconfigured or problematic test resources.

A computing service 226 may be triggered to instruct a real-time notification service 231 to send a notification to the tester 109. The real-time notification service 231 may send a notification (e.g., a real-time notification), such an email, text message, phone call, etc., regarding the test account and/or test artifact status to the tester 109. For example, the notification may be sent near or past an account or artifact recycle, suspension, or release date. The computing service 226 may cause data indicative of the notification to be stored in a storage subsystem 228. The computing service 226 may be an on-demand code execution service that executes one or more serverless functions. The computing service 226 may include a "serverless" function which may include code that can be executed on demand.

In embodiments, the auditor 218 calls the account cleaner service 230 to clean up and/or suspend test accounts. For example, if the auditor 218 determines that a test account has expired, the auditor 218 may call in the account cleaner service 230 to automatically suspend the test account and clean up, e.g., remove or update, any artifacts associated with the test account. Likewise, the auditor 218 may determine, before a test account expires, that artifacts associated with the test account need to be "cleaned up." In embodiments, before test accounts that were created outside of the testing service 130 are automatically suspended, they will be converted to "internal" test accounts before being automatically suspended. An internal test account is one that was created using the testing service 130.

Test artifacts may need to be cleaned up so that no financial impact or reporting impact remains from the testing. For example, cleaning up test artifacts may comprise zeroing out the financial or reporting impact of testing, such as by reversing credit card charges and tax records, cancelling subscriptions, or cancelling billing support. Test artifacts may additionally or alternatively need to be cleaned up in order to release any computing resources, such as storage or support agreements acquired through testing. For example, cleaning up testing artifacts may comprise releasing cloud computing resources so that they may be used by another party and/or for another purpose.

For example, the auditor 218 may determine on a lifecycle state date that artifacts associated with a not-yet-expired test account need to be cleaned up. The auditor 218 may call in the account cleaner service 230 to clean-up test artifacts associated with a not-yet-expired test account. The account cleaner service 230 can update the test account status in the storage 210. In some embodiments, the account cleaner service 230 may be implemented using one or more serverless functions executed by an on-demand code execution service (e.g., a computing service 232). The on-demand code execution service may include a serverless function which may include code that can be executed on demand.

Figure 9:
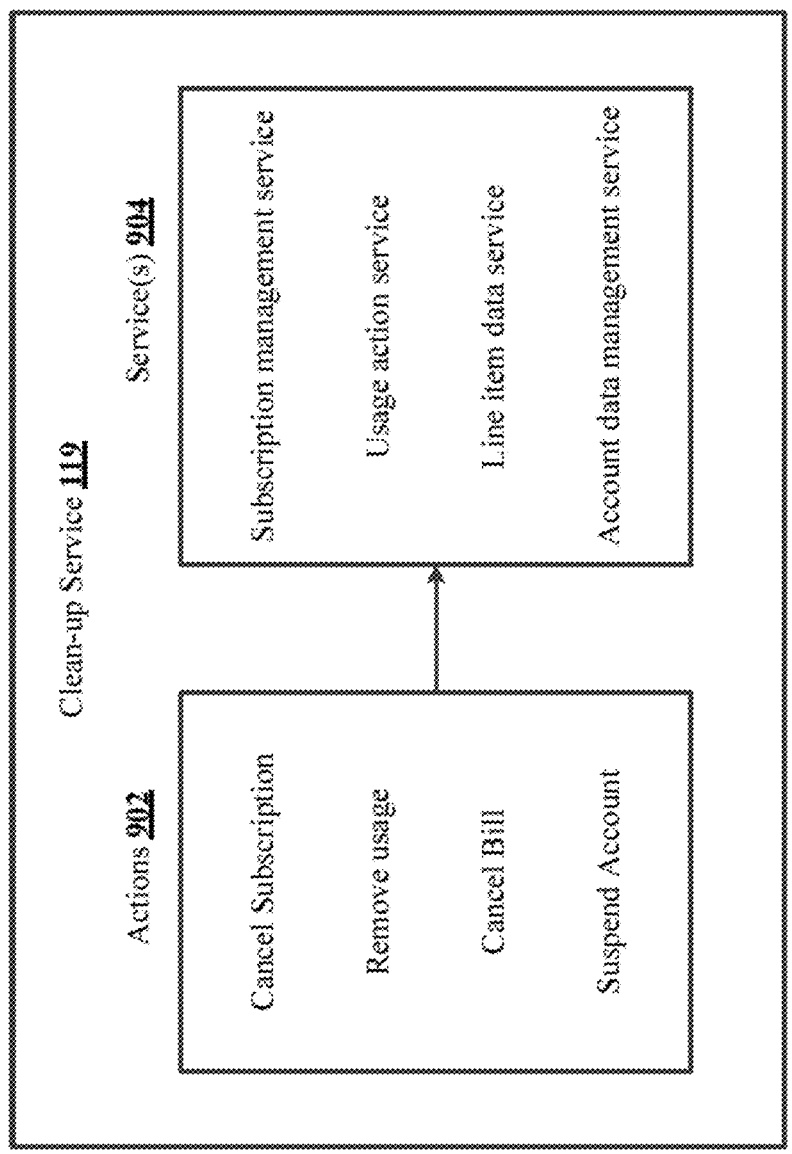
FIG. 9 diagram illustrating an example framework for clean-up service.

In embodiments, if the auditor 218 calls the account cleaner service 230 to clean up and/or suspend test accounts, the account cleaner service 230 will call a clean-up service 119 to perform account cleaning steps. As illustrated in FIG. 9, the clean-up service 119 performs various actions 902 to clean-up test accounts or clean-up artifacts by calling various other services 904. For example, the clean-up service 119 can cancel a subscription by calling a subscription management service. The clean-up service 119 can remove usage by calling a usage action service. The clean-up service 119 can cancel a bill by calling a line-item data service. The clean-up service 119 can suspend an account by calling an account data management service. In other embodiments, the clean-up service 119 can perform different or additional actions, such as by calling different or additional services. When an account is suspended, the account identification number associated with that account may later be reused.

In certain embodiments, the tester 109 can specify which action(s) the clean-up service 119 should take with respect to certain test accounts or artifacts. The tester 109 may define the actions that he or she wants the clean-up service 119 to take. For example, if a test artifact is a bill, the tester 109 might want the clean-up service 119 to cancel the bill. Alternatively, the tester 109 might want the clean-up service 119 to refund the bill.

Referring back again to FIG. 2, in embodiments, the auditor 218 is in communication with a cost tracking service. The cost tracking service can track computing costs associated with test accounts and/or test artifacts. The cost tracking service can determine budgeting forecasts to support testing of program launches. The computing cost budget forecast may be determined, for example, using historical data associated with other testing projects and/or using one or more machine learning algorithms. The cost tracking service can track how much of the budget remains and/or how much of the budget has already been utilized. The cost tracking service can notify test owners via a dashboard regarding costs of test accounts and/or test artifacts.

In certain embodiments, the tester 109 can view all the test results associated to a test account in a single view within the test account pool management service 204. For example, the tester 109 can view all the test results associated to a test account in a single view via the web user interface 202 of the test account pool management service 204. After a test is finished, the tester 109 may view the result of that test along with the status or results of any other tests associated to the same test account in a single view. For example, the tester 109 can view all test results for each test account by clicking on a particular test account listed in a particular test account pool. If the tester 109 selects a test account listed in a particular account pool, a request for the test result(s) (e.g., a getTestResult request) will be sent to the API gateway 206. The API gateway 206 triggers the computing service 208 to query the storage subsystem 210 and return all test results associated with the account ID of the test account. The tester 109 can be directed to a new web page that lists all the test results.

Figure 10:
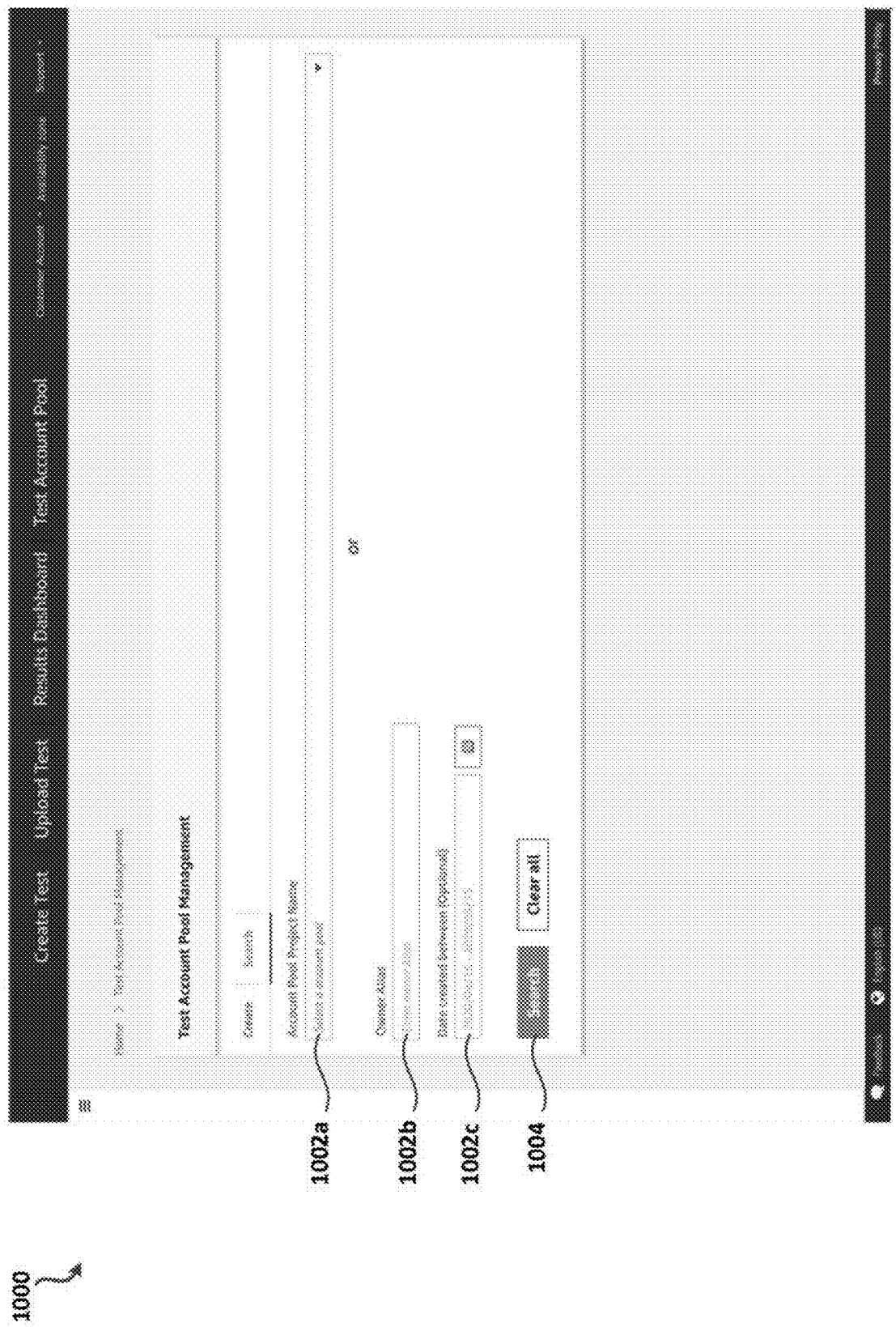
FIG. 10 is another example user interface for test account pool management.

In certain embodiments, to view all the test results associated to a test account in a single view, the tester 109 may search for a particular test account pool. For example, the tester 109 may search for the test account pool to which the test account belongs. FIG. 10 illustrates a UI 1000 depicting a search for a test account pool. To search for a test account pool, the tester 109 can populate one or more of the boxes 1002a-c. For example, the tester 109 can populate the box 1002a with a name of the test account pool that the tester 109 is looking for. The tester 109 can populate the box 1002b with an owner alias associated with the test account pool that the tester 109 is looking for. The tester 109 can populate the box 1002c with the creation date of the test account pool that the tester 109 is looking for. The tester 109 does not need to fill in all of the boxes 1002a-c. For example, the tester 109 may not know one or more of the name, owner alias, or creation date. In such cases, the tester 109 can fill in only a subset of the boxes 1002a-c. After the tester 109 has populated one or more of the boxes 1002a-c, the tester 109 may select a button 1004 to run the search. In other embodiments, the tester 109 may be able to search for test account pools using additional or alternative criteria, including SOR.

Figure 11A:
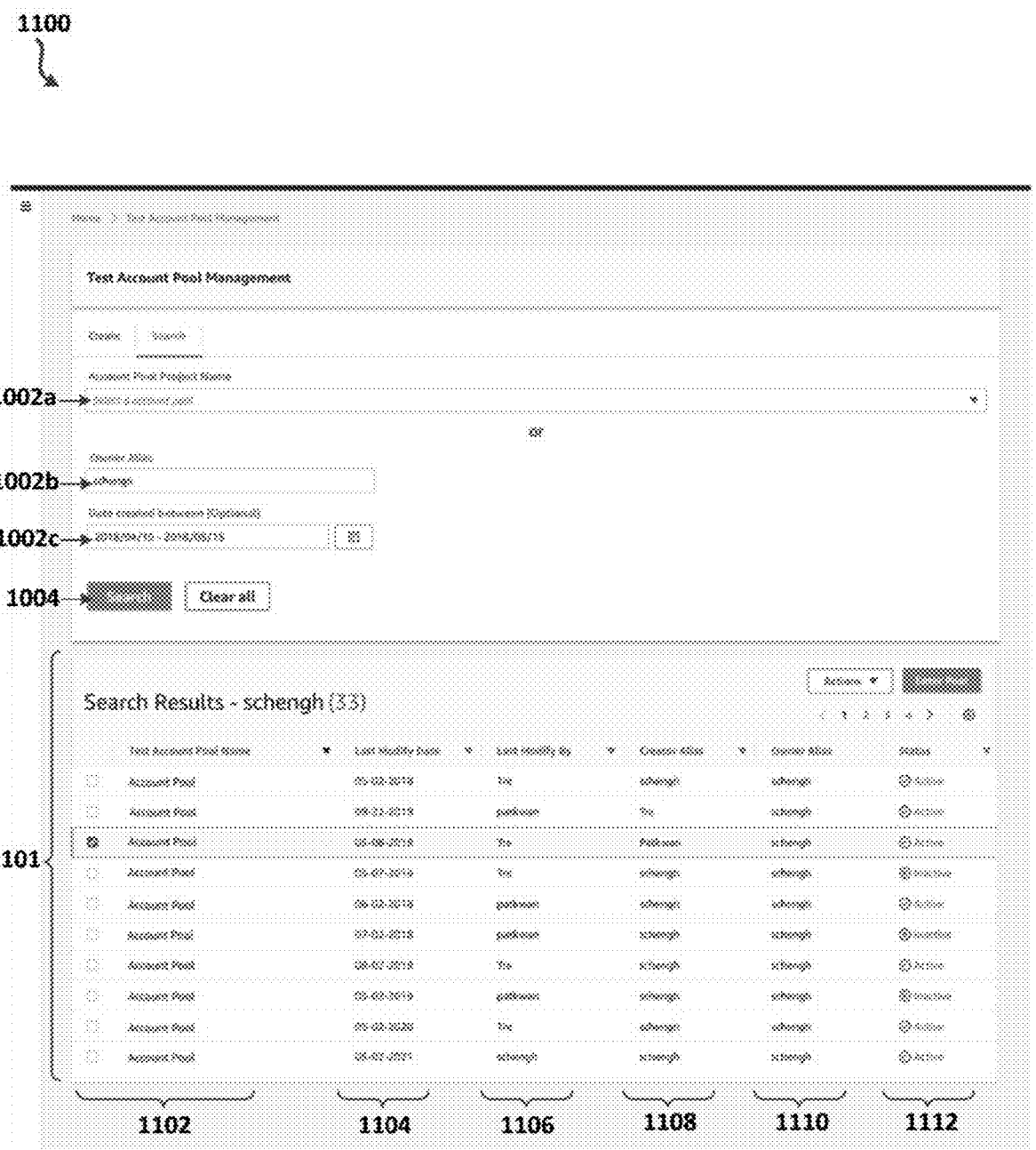

FIG. 11A illustrates a UI 1100 depicting a populated search for a test account pool. The boxes 1002b-c are populated by the tester 109. The box 1002a is not populated. The tester 109 may not have populated the box 1002 because the user does not know the name of desired the test account pool, or for any other reason. The button 1004 was selected to run the search. A request for the test account pools that fit the criteria indicated in the boxes 1002b-c will be sent to the API gateway 206. The API gateway 206 triggers the computing service 208 to query the storage subsystem 210 and return all test account pool results that fit the criteria.

The tester 109 can be directed to a new web page interface 1101 (e.g., web page interface 202) that lists all the test account pool results. The test account pool results include those test pool accounts that fit the search criteria entered by the tester 109. Each row of the table on the web page interface 1101 is associated with a particular test account pool result. The web page interface 1101 indicates, in a first column 1102, the names of the test account pool results. The web page interface 1101 indicates, in a second column 1104, the last modification date of the test account pool results. The web page interface 1101 indicates, in a third column 1106, the names of users that last modified the test account pool results. The web page interface 1101 indicates, in a fourth column 1108, the aliases of the users that created the test account pool results. The web page interface 1101 indicates, in a fifth column 1110, the aliases of the users that own the test account pool results. The web page interface 1101 indicates, in a sixth column 1112, the status of the test account pool results. An active status indicates that the test pool account contains test accounts that are active (e.g., not expired). Conversely, an inactive status indicates that the test pool account does not contain test accounts that are active.

FIG. 11B illustrates an alternative table 1113 that may be displayed on the web page interface 1101. The table 1113 may indicate test account pool results. However, the table 1113 includes different columns than the table discussed above with regard to FIG. 11A. For example, the table 1113 includes a column indicating identifiers of the test account pool results and a column indicating the creation date of the test account pool results.

In certain embodiments, the tester 109 can select a test account pool from the test account pool results. For example, referring back to FIG. 11A, the tester 109 may select a test account pool from the test account pool results by clicking on or checking a box next to the desired test account pool name. If the tester 109 selects a test account pool from the test account pool results, all test accounts in the selected test account pool may be displayed via an account pool content page.

Figure 12A:

FIG. 12A illustrates a UI 1200 depicting an account pool content page. The account pool content page lists all the test accounts belonging to the specific test account pool selected by the tester 109. Comprehensive information about the selected test account pool is listed in an upper box 1202. For example, the upper box 1202 indicates an identification number associated with the selected test account pool, a name of the selected test account pool, a creator and owner of the selected test account pool, a date at which the selected test account pool was last modified, an alias of the user that last modified the selected test account pool, a creation date of the selected test account pool, and a status of the selected test account pool. As described above, an active status indicates that the selected test pool account contains test accounts that are active (e.g., not expired). Conversely, an inactive status indicates that the selected test pool account does not contain test accounts that are active. In certain embodiments, the tester 109 can configure the test account pool attributes on the account pool content page by clicking an "edit" button 1203.

The test accounts in the selected test pool account are listed in a table 1204 below the upper box 1202. The table 1204 indicates, in a first column 1206, an account identification number associated with each test account. The table 1204 indicates, in a second column 1208, a marketplace group associated with each test account. The table 1204 indicates, in a third column 1210, a system of record associated with each test account. The table 1204 indicates, in a fourth column 1212, a payment instrument associated with each test account. The table 1204 indicates, in a fifth column 1214, a date of creation associated with each test account. The table 1204 indicates, in a sixth column 1216, any existing notes associated with each test account. The tester 109 can add notes to each test account. The table 1204 indicates, in a seventh column 1218, a state associated with each test account. A "ready for test" state means the test account is not in test. A "test in progress" state indicates that the test account is currently in use (e.g., currently running a test). The tester 109 can search and sort the columns 1206-1218 and the tester 109 can move test accounts between pools.

FIG. 12B illustrates an alternative table 1220 that may be displayed on an account pool content page. The table 1220 may indicate the test accounts in the selected test pool account. However, the table 1220 includes different columns than the table discussed above with regard to FIG. 12A. For example, the table 1220 includes a column indicating identifiers of the test account pool and a column indicating country code.

In certain embodiments, the tester 109 can select a test account from the test account results. For example, referring back to FIG. 12A, the tester 109 may select a test account from the test account results by clicking on or checking a box next to the desired test account identification number or name on the account pool content page. If the tester 109 selects a test account from the test account results, all tests and/or test results associated with the selected test account may be displayed via a rest result page.

Figure 13A:

FIG. 13A illustrates a UI 1300 depicting a test result page. The test result page lists all the tests associated with the specific test account selected by the tester 109. Comprehensive information about the selected test account is listed in an upper box 1302. For example, the upper box 1302 indicates an account identification number associated with the selected test account, a marketplace group associated with the selected test account, a country code associated with the selected test account, a payment instrument associated with the selected test account, a date of creation associated with the selected test account, an address associated with the selected test account, any note(s) associated with the selected test account, and a state associated with the selected test account. As discussed above, a "ready for test" state means the test account is not in test. A "test in progress" state indicates that the test account is currently in use (e.g., currently running a test).

The tests and/or test results are listed in a table 1304 below the upper box 1302. The table 1304 indicates, in a first column 1306, an account identification number associated with each test. The table 1204 indicates, in a second column 1308, a creation date of the test. The table 1304 indicates, in a third column 1310, an alias responsible for running the test. The table 1304 indicates, in a fourth column 1312, a description associated with each test. The table 1304 indicates, in a fifth column 1314, one or more test account pools to which each test belongs. As indicated in the table 1304, a particular test may belong to more than one test account pool. The tester 109 can view a test account pool by clicking the test account pool name under the fifth column 1314. The table 1304 indicates, in a sixth column 1306, a status associated with each test. A "success status means that the test was successfully run, whereas a "failed" test status means that the test was not successfully run. The tester 109 can search and sort the columns 1306-1316. The tester 109 can view the test results in the table down below and narrow down the results by searching and sorting.

FIG. 13B illustrates an alternative table 1320 that may be displayed on a test result page. The table 1320 may indicate the tests in the selected test account. However, the table 1320 includes different columns than the table discussed above with regard to FIG. 13A. For example, the table 1320 includes a column indicating the identifier of the test account.

In certain embodiments, the tester 109 can select a single test result and view the details of it. For example, referring back to FIG. 12A, the tester 109 may select a test result from the test results and view the details of the test result by clicking by clicking a button 1303. If the tester 109 selects a test result and the button 1303, details associated with the selected test result may be displayed.

Figure 14:
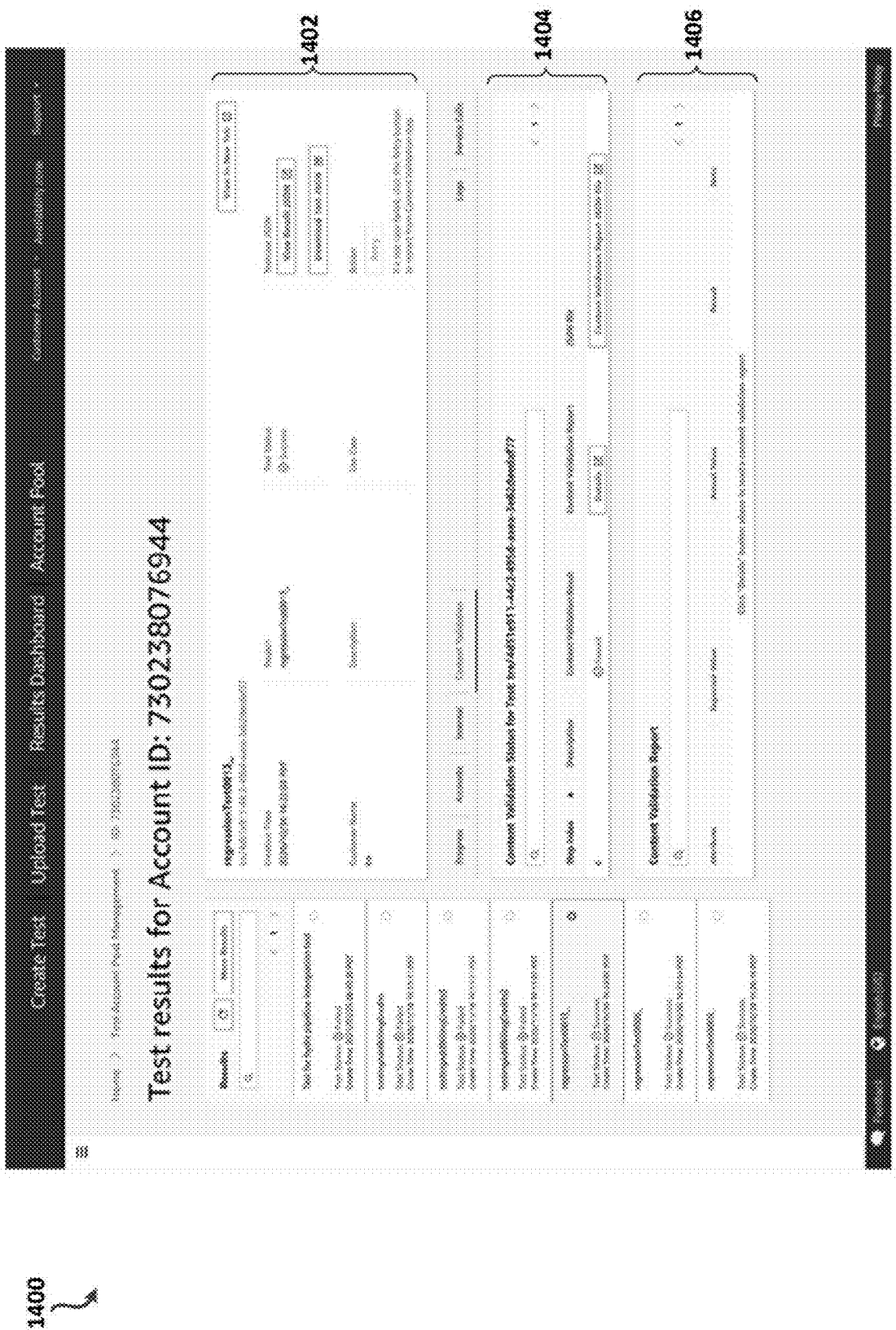
FIG. 14 is another example user interface for test account pool management.

FIG. 14 illustrates a UI 1400 depicting a test details page. The test details page lists all the details associated with the specific test selected by the tester 109. Comprehensive information about the selected test is listed in an upper box 1402. For example, the upper box 1402 indicates a name of the selected test, a creation time/date of the selected test, a synthetic customer name associated with the selected test, a project associated with the selected test, a description associated with the selected test, a test status associated with the selected test, a use case associated with the selected test, a testcase associated with the selected test, and/or any other details associated with the selected test. The validation status of the selected test is listed in a box 1404 below the upper box 1402. The validation report associated with the selected test is listed in a box 1406 below the upper box 1402.

Figure 15:
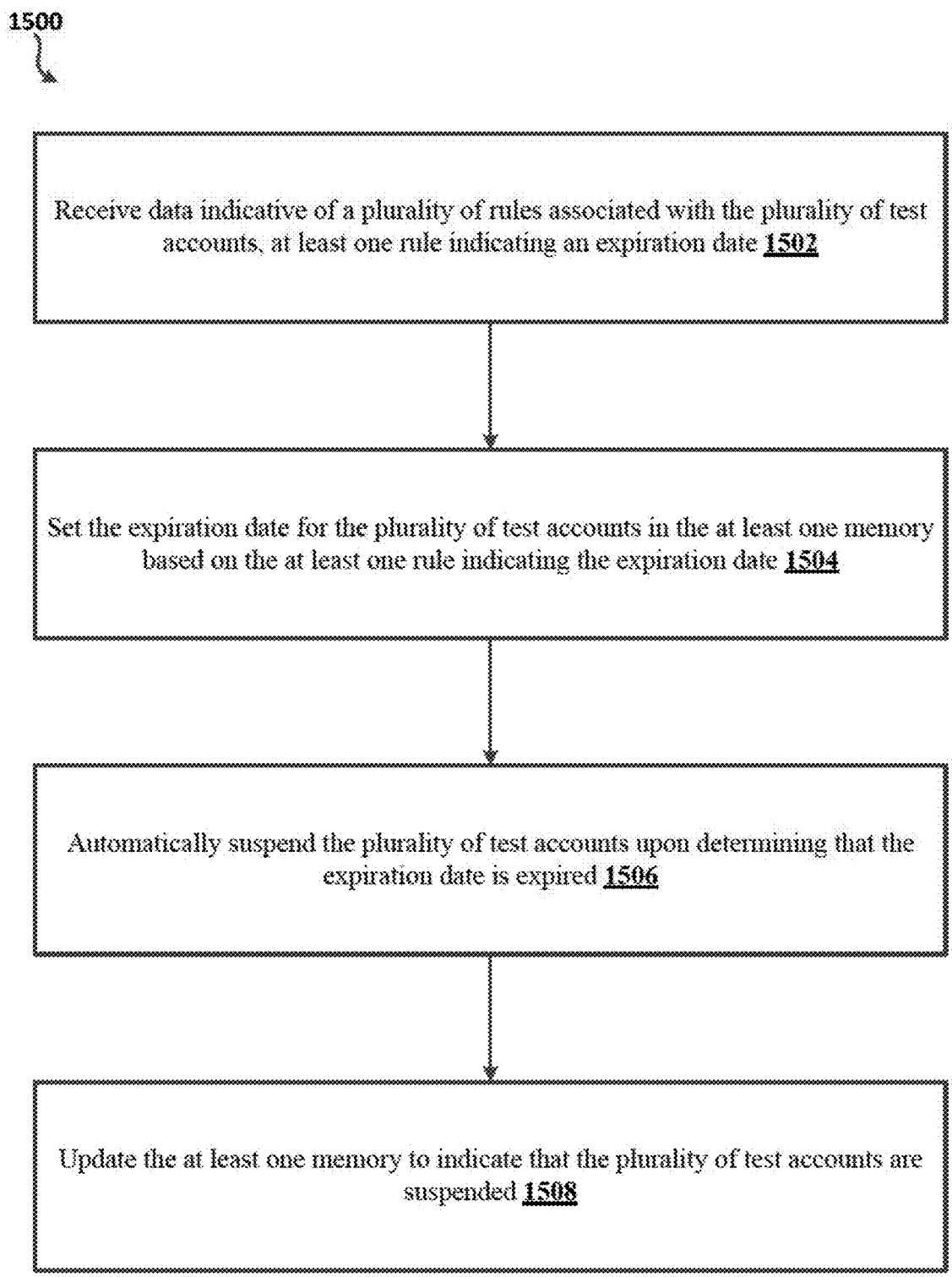
FIG. 15 is a flowchart showing an example process for managing testing accounts.

FIG. 15 shows a flow diagram 1500 is a flow diagram showing an illustrative routine for managing testing accounts. As described above, rules associated with test accounts and/or with test artifacts may be received (such as by rule management service 212). At 1502, data indicative of a first plurality of rules associated with a first subset of a plurality of test accounts may be received. At least one rule indicates an expiration date. In embodiments, the rules are received from a tester (e.g., the tester 109) that defined such rules using a web user interface (e.g., web user interface 202) and then uploaded the rules. The expiration date for a particular test account can indicate a date on which the tester wants that test account to expire.

The received data can be stored in at least one memory (e.g., in the storage subsystem 216). The stored rules may be utilized to determine an expiration date for each of the test accounts. At 1504, the expiration date for the first subset of test accounts may be set in the at least one memory based on the at least one rule indicating the expiration date. The test accounts may be monitored to determine when a test account is about to expire. At 1506, the first subset of test accounts may be automatically suspended upon determining that the expiration date is expired.

At 1508, the at least one memory may be updated to indicate that the first subset of test accounts are suspended. Updating the at least one memory to indicate that the first subset of test accounts are suspended may comprise indicating that at least one of the first subset of test accounts is available for reuse. For example, indicating that at least one of the first subset of test accounts is available for reuse may comprise indicating that an identification number associated with the at least one of the first subset of test accounts is available for reuse.

In an embodiment, data indicative of a second plurality of rules associated with a second subset of the plurality of test accounts may be received. At least one rule of the second plurality of rules is an anomaly detection rule. However, the second plurality of rules do not indicate an expiration date. The second subset of test accounts may be monitored for anomalies based on the anomaly detection rule without suspending the second subset of test accounts.

Figure 16:
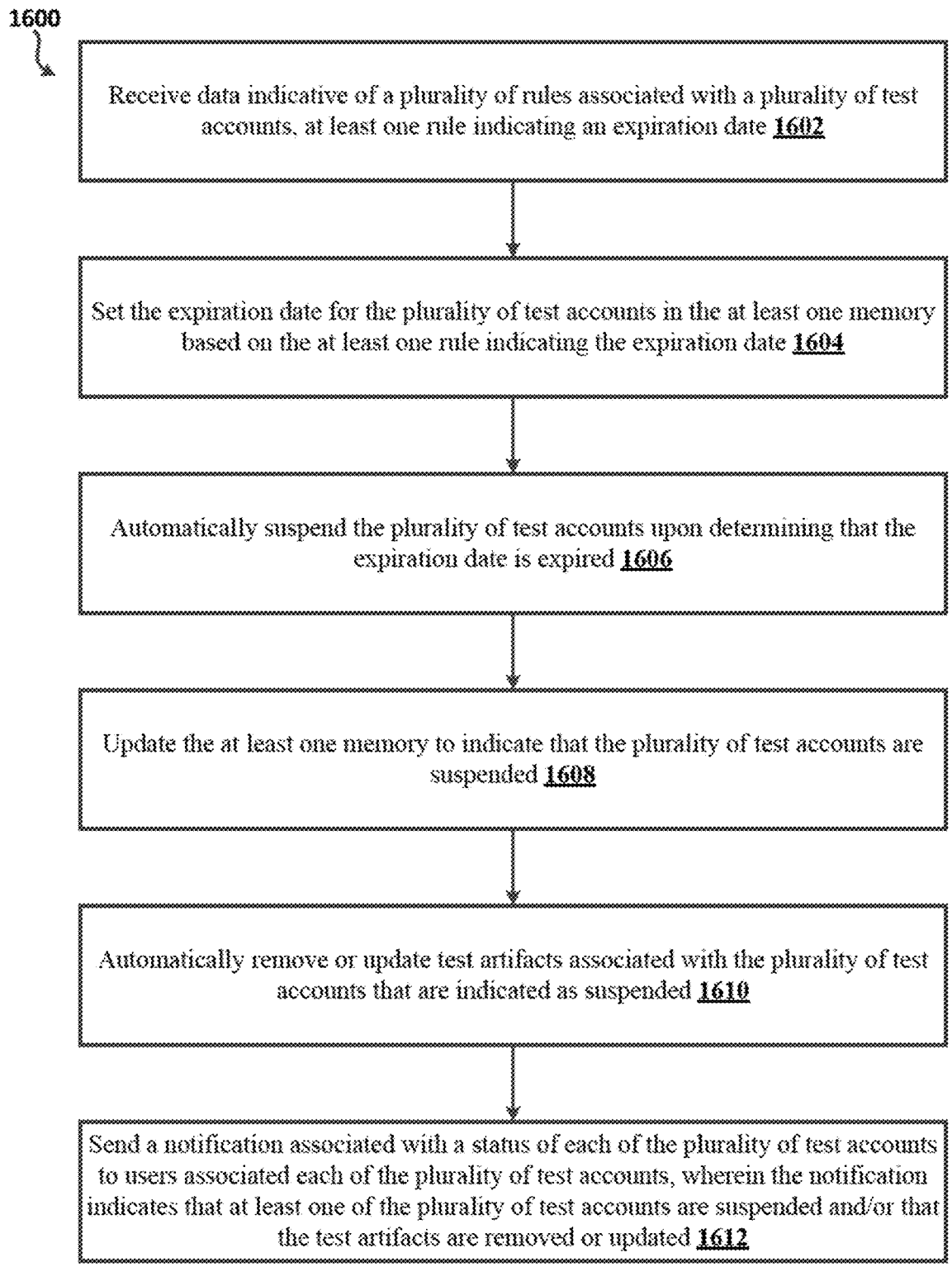
FIG. 16 is a flowchart showing another example process for managing testing accounts.

FIG. 16 shows a flow diagram 1600 is a flow diagram showing an illustrative routine for managing testing accounts. As described above, rules associated with test accounts and/or with test artifacts may be received (such as by rule management service 212). At 1602, data indicative of a plurality of rules associated with a plurality of test accounts may be received. At least one rule indicates an expiration date. In embodiments, the rules are received from a tester (e.g., the tester 109) that defined such rules using a web user interface (e.g., web user interface 202) and then uploaded the rules. The expiration date for a particular test account can indicate a date on which the tester wants that test account to expire.

The received data can be stored in at least one memory (e.g., in the storage subsystem 216). The stored rules may be utilized to determine an expiration date for each of the test accounts. At 1604, the expiration date for the plurality of test accounts may be set in the at least one memory based on the at least one rule indicating the expiration date. The test accounts may be monitored to determine when a test account is about to expire. At 1606, the plurality of test accounts may be automatically suspended upon determining that the expiration date is expired.

At 1608, the at least one memory may be updated to indicate that the plurality of test accounts are suspended. Updating the at least one memory to indicate that the plurality of test accounts are suspended may comprise indicating that at least one of the plurality of test accounts is available for reuse. For example, indicating that at least one of the plurality of test accounts is available for reuse may comprise indicating that an identification number associated with the at least one of the plurality of test accounts is available for reuse.

At 1610, test artifacts associated with the plurality of test accounts that are indicated as suspended may be automatically removed or updated. In embodiments, rules associated with the plurality of test accounts that indicate a manner in which the test artifacts associated with each of the plurality of tests accounts are to be treated after each of the plurality of test accounts is suspended may be applied. For example, applying rules associated with the plurality of test accounts that indicate a manner in which the test artifacts associated with each of the plurality of tests accounts are to be treated can comprise causing a subscription associated with at least one of the plurality of test accounts to be cancelled, removing usage information associated with at least one of the plurality of test accounts, cancelling a bill associated with at least one of the plurality of test accounts, or refunding a bill associated with at least one of the plurality of test accounts.

At 1612, a notification associated with a status of each of the plurality of test accounts may be sent to users associated each of the plurality of test accounts. The notification can indicate that at least one of the plurality of test accounts are suspended. The notification an additionally, or alternatively, indicate that the test artifacts are removed or updated.

FIG. 17 shows a flow diagram 1700 is a flow diagram showing an illustrative routine for managing testing accounts. As described above, rules associated with test accounts and/or with test artifacts may be received (such as by rule management service 212). At 1702, data indicative of a plurality of rules associated with a plurality of test accounts may be received. At least one rule indicates an expiration date. In embodiments, the rules are received from a tester (e.g., the tester 109) that defined such rules using a web user interface (e.g., web user interface 202) and then uploaded the rules. The expiration date for a particular test account can indicate a date on which the tester wants that test account to expire. At least one other rule indicates at least one life cycle date associated with each of the plurality of test accounts. The least one life cycle date occurs before the expiration date. For example, the least one life cycle date occurs before the date on which the test wants the test account to be suspended. At 1704, it may be determined that the at least one life cycle date is the current date. At 1706, test artifacts associated with the each of the plurality of test accounts may be automatically removed or updated without suspending the test accounts. The test accounts may later be suspended, such as when the expiration date arrives. At 1708, a notification associated with a status of each of the plurality of test accounts may be sent to users associated with each of the plurality of test accounts. The notification can indicate at least that the test artifacts have been removed.

In at least some embodiments, a server that implements a portion or all of one or more of the technologies described herein may include a general-purpose computer system that includes or is configured to access one or more computer-accessible media. FIG. 16 depicts a general-purpose computer system that includes or is configured to access one or more computer-accessible media. The example computer system of FIG. 16 may be configured to implement provider network 100 of FIG. 1 and/or any component of the provider network 100 (e.g., the service(s) 115A-N, the testing service 130, the test account pool service 118, the clean-up service 119, the control plane 112), the network 110, or the user device 106. The example computer system of FIG. 16 may be configured to implement any of the methods described herein, such as any methods (e.g., or any operations) associated with FIG. 15-17.

In the illustrated embodiment, computing system 1800 includes one or more processors 1810a, 1810b and/or 1810n (which may be referred herein singularly as "a processor 1810" or in the plural as "the processors 1810") coupled to a system memory 1820 via an input/output (I/O) interface 1830. Computing system 1800 further includes a network interface 1840 coupled to I/O interface 1830.

In various embodiments, the computing system 1800 may be a uniprocessor system including one processor 1810 or a multiprocessor system including several processors 1810 (e.g., two, four, eight or another suitable number). Processors 1810 may be any suitable processors capable of executing instructions. For example, in various embodiments, processors 1810 may be general-purpose or embedded processors implementing any of a variety of instruction set architectures (ISAs), such as the x186, PowerPC, SPARC or MIPS ISAs or any other suitable ISA. In multiprocessor systems, each of processors 1810 may commonly, but not necessarily, implement the same ISA.

System memory 1820 may be configured to store instructions and data accessible by processor(s) 1810. In various embodiments, system memory 1820 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1820 as code 1825 and data 1826.

In an embodiment, I/O interface 1830 may be configured to coordinate I/O traffic between processor 1810, system memory 1820 and any peripherals in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computing system 1800 and other device or devices 1860 attached to a network or networks 1850, such as other computer systems or devices, for example. In various embodiments, network interface 1840 may support communication via any suitable wired or wireless general data networks, such as types of Ethernet networks, for example. Additionally, network interface 1840 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 1820 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing system 1800 via I/O interface 1830. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing system 1800 as system memory 1820 or another type of memory. Further, a computer-accessible medium may include transmission media or signals such as electrical, electromagnetic or digital signals conveyed via a communication medium such as a network and/or a wireless link, such as those that may be implemented via network interface 1840. Portions or all of multiple computing devices such as those illustrated in FIG. 18 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing system," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for test account management, the system comprising:
  at least one memory configured to store data for a plurality of test accounts, wherein the plurality of test accounts are hosted on a provider network and wherein the plurality of test accounts are reserved for use in testing features to be provided on the provider network for use by customer accounts on the provider network, and wherein the plurality of test accounts are assigned at least one virtual machine computing instance by the provider network, wherein at least one test account tests operation of the features using an execution environment of the assigned virtual machine computing instance, and wherein the at least one test account accrues usage of system resources including usage of the assigned virtual machine computing instance when the at least one test account is not in use and as a result of the system resources association with the at least one test account, wherein the plurality of test accounts are associated with a test account pool;
  at least one processor in communication with the at least one memory, the at least one processor configured at least to:

receive data indicative of a first plurality of rules associated with a first subset of the plurality of test accounts, at least one rule indicating an expiration date;

set the expiration date for the first subset of the plurality of test accounts in the at least one memory based on the at least one rule indicating the expiration date;

automatically suspending, by a process operating on the provider network, the first subset of the plurality of test accounts upon determining that the expiration date is expired and reclaiming the system resources used by the at least one test account and supporting the at least one virtual machine computing instance, where the resources and the at least one virtual machine computing instance are recovered for use in the provider network; and update the at least one memory to indicate that the first subset of the plurality of test accounts are suspended.

2. The system of claim 1, wherein the at least one processor is further configured to automatically remove or update test artifacts associated with the first subset of the plurality of test accounts that are indicated as suspended.

3. The system of claim 1, wherein the at least one processor is further configured to apply rules associated with the first subset of the plurality of test accounts that indicate a manner in which test artifacts associated with the first subset of the plurality of tests accounts are to be treated after the first subset of test accounts are suspended.

4. The system of claim 3, wherein the at least one processor is further configured to apply rules associated with the first subset of the plurality of test accounts that indicate a manner in which the test artifacts associated with the first subset of the plurality of test accounts are to be treated comprises at least one of causing a subscription associated with at least one of the first subset of the plurality of test accounts to be cancelled, removing usage information associated with at least one of the first subset of the plurality of test accounts, cancelling a bill associated with at least one of the first subset of the plurality of test accounts, or refunding a bill associated with at least one of the first subset of the plurality of test accounts.

5. The system of claim 1, wherein the first plurality of rules associated with the first subset of the plurality of test accounts further indicate at least one life cycle date associated with the first subset of the plurality of test accounts, the at least one life cycle date occurring before the expiration date.

6. The system of claim 5, wherein the at least one processor is further configured at least to:
determine that the at least one life cycle date is a current date; and
automatically remove test artifacts associated with the first subset of the plurality of test accounts without suspending the test accounts.

7. The system of claim 6, wherein the at least one processor is further configured at least to:
send a notification associated with a status of the first subset of the plurality of test accounts to users associated with the first subset of the plurality of test accounts, wherein the notification indicates at least that the test artifacts have been removed.

8. The system of claim 1, wherein the at least one processor is further configured at least to:
send a notification associated with a status of the first subset of the plurality of test accounts to users associated with the first subset of the plurality of test accounts, wherein the notification indicates that at least one of the first subset of the plurality of test accounts are suspended.

9. The system of claim 1, wherein updating the at least one memory to indicate that the first subset of the plurality of test accounts are suspended comprises indicating that at least one of the first subset of the plurality of test accounts is available for reuse.

10. The system of claim 1, wherein the at least one processor is further configured at least to:
receive input from a user indicative of adding at least one of a new test account pool or a new test account to add to one of a plurality of test account pools.

11. The system of claim 1, wherein the at least one processor is further configured at least to:
receive data indicative of a second plurality of rules associated with a second subset of the plurality of test accounts, wherein at least one rule of the second plurality of rules is an anomaly detection rule and wherein the second plurality of rules do not indicate an expiration date; and
monitoring the second subset of the plurality of test accounts for anomalies based on the anomaly detection rule without suspending the second subset of test accounts.

12. A method comprising:
receiving data indicative of a plurality of rules associated with a plurality of test accounts, wherein the plurality of test accounts are hosted on a provider network and wherein the plurality of test accounts are reserved for use in testing features to be provided on the provider network for use by customer accounts on the provider network, and wherein the plurality of test accounts are assigned at least one virtual machine computing instance by the provider network, wherein at least one test account tests operation of the features using an execution environment of the assigned virtual machine computing instance, and wherein the at least one test account that accrues usage of system resources including usage of the assigned virtual machine computing instance when the at least one test account is not in use and as a result of the system resources association with the at least one test account, wherein the plurality of test accounts are associated with a test account pool and wherein at least one rule indicates an expiration date;
setting the expiration date for the plurality of test accounts in at least one memory based on the at least one rule indicating the expiration date;
automatically suspending, by a process operating on the provider network, the plurality of test accounts upon determining that the expiration date is expired by reclaiming the system resources used by the at least one test account and supporting the at least one virtual machine computing instance, where the resources and the at least one virtual machine computing instance are recovered; and
update the at least one memory to indicate that the plurality of test accounts are suspended.

13. The method of claim 12, further comprising:
automatically removing or updating test artifacts associated with the plurality of test accounts that are indicated as suspended.

14. The method of claim 12, further comprising:
applying rules associated with the plurality of test accounts that indicate a manner in which test artifacts associated with the plurality of tests accounts are to be treated after the plurality of test accounts are suspended.

15. The method of claim 12, wherein the plurality of rules associated with the plurality of test accounts further indicate at least one life cycle date associated with the plurality of test accounts, the at least one life cycle date occurring before the expiration date, the method further comprising:
determining that the at least one life cycle date is a current date; and
automatically removing test artifacts associated with the plurality of test accounts without suspending the test accounts.

16. The method of claim 12, further comprising:
sending a notification associated with a status of the plurality of test accounts to users associated the plurality of test accounts, wherein the notification indicates that at least one of the plurality of test accounts are suspended.

17. A non-transitory computer-readable medium storing instructions that, upon execution, at least cause:
receiving, from at least one database, data indicative of a plurality of test account pools, wherein test account pools among the plurality of test account pools comprises test accounts, wherein the test accounts are hosted on a provider network and wherein the test accounts are assigned at least one virtual machine computing instance by the provider network, wherein the test accounts test operation of features using an execution environment of the assigned virtual machine computing instance, and wherein the test accounts accrue usage of system resources including usage of the assigned virtual machine computing instance when the test accounts are not in use and as a result of the systems resource association with the test accounts, wherein the test accounts are reserved for use in testing the features to be provided on the provider network for use by customer accounts on the provider network;
receiving, from a first subsystem, data indicative of rules associated with the test accounts, wherein the data indicative of rules associated with the test accounts indicates at least an expiration date associated with the test accounts;
determining that a first test account is expired by comparing a current date to the expiration date associated with the first test account;
automatically cause the first test account to be suspended by a process operating on the provider network and reclaiming resources used by the first test account and supporting the at least one virtual machine computing instance, where the resources and the at least one virtual machine computing instance are recovered for use in the provider network, wherein the suspension is based on determining that the first test account is expired; and
updating the at least one database to indicate that the first test account is suspended.

18. The non-transitory computer-readable medium of claim 17, wherein updating the at least one database to indicate that the test accounts are suspended comprises indicating that at least one of the test accounts is available for reuse.

19. The non-transitory computer-readable medium of claim 17, wherein the instructions, when executed, further cause:
applying rules associated with the test accounts that indicate a manner in which test artifacts associated with the test accounts are to be treated after the test accounts are suspended.

20. The non-transitory computer-readable medium of claim 17, wherein the instructions, when executed, further cause:
receiving input from a user indicative of adding at least one of a new test account pool or a new test account to add to one of the plurality of test account pools.

\* \* \* \* \*